US009729414B1

(12) United States Patent
Oliveira et al.

(10) Patent No.: US 9,729,414 B1
(45) Date of Patent: Aug. 8, 2017

(54) MONITORING SERVICE AVAILABILITY USING DISTRIBUTED BGP ROUTING FEEDS

(71) Applicant: ThousandEyes, Inc., San Francisco, CA (US)

(72) Inventors: Ricardo V. Oliveira, San Francisco, CA (US); Michael Meisel, San Francisco, CA (US); Ryan Braud, San Francisco, CA (US)

(73) Assignee: ThousandEyes, Inc., San Francisco, CA (US)

( * ) Notice: Subject to any disclaimer, the term of this patent is extended or adjusted under 35 U.S.C. 154(b) by 0 days.

(21) Appl. No.: 14/692,664

(22) Filed: Apr. 21, 2015

Related U.S. Application Data

(63) Continuation-in-part of application No. 14/210,128, filed on Mar. 13, 2014, which is a continuation of application No. 13/839,214, filed on Mar. 15, 2013.

(60) Provisional application No. 61/982,553, filed on Apr. 22, 2014, provisional application No. 61/649,473, filed on May 21, 2012.

(51) Int. Cl.
*G06F 11/00* (2006.01)
*H04L 12/26* (2006.01)

(52) U.S. Cl.
CPC ........ *H04L 43/0805* (2013.01); *H04L 43/062* (2013.01)

(58) Field of Classification Search
CPC .. G06F 11/3006; G06F 11/3089; H04L 43/12; H04L 43/0805
USPC .............................................. 714/47.1–47.3
See application file for complete search history.

(56) References Cited

U.S. PATENT DOCUMENTS

| | | |
|---|---|---|
| 5,940,376 A | 8/1999 | Yanacek et al. |
| 6,611,955 B1 | 8/2003 | Logean et al. |
| 6,744,739 B2 | 6/2004 | Martin |
| 6,892,227 B1 | 5/2005 | Elwell et al. |
| 7,231,555 B2 | 6/2007 | Barnard et al. |
| 7,423,979 B2 | 9/2008 | Martin |
| 7,487,240 B2 | 2/2009 | Proulx et al. |
| 7,529,192 B2 * | 5/2009 | Labovitz ................. H04L 41/12 370/236 |

(Continued)

FOREIGN PATENT DOCUMENTS

| | | |
|---|---|---|
| CN | 100388695 | 5/2008 |
| EP | 2222025 | 8/2010 |

OTHER PUBLICATIONS

Author Unknown, BGPlay @ Route Views, Apr. 14, 2015 retrieved from https://web.archive.org/web/20150414123115/http://bgplay.routeviews.org/main.html.

(Continued)

*Primary Examiner* — Elmira Mehrmanesh
(74) *Attorney, Agent, or Firm* — Van Pelt, Yi & James LLP

(57) ABSTRACT

Techniques for monitoring service availability using distributed Border Gateway Protocol (BGP) routing feeds are disclosed. In some embodiments, monitoring service availability using distributed BGP routing feeds includes collecting BGP routing data from a plurality of distributed route monitors; aggregating the collected BGP routing data into bins; and determining a BGP metric based on the aggregated and collected BGP routing data. Example BGP metrics include a reachability metric, number of path changes metric, and a number of BGP updates metric.

51 Claims, 16 Drawing Sheets

(56) References Cited

U.S. PATENT DOCUMENTS

| | | | |
|---|---|---|---|
| 7,616,579 | B2 | 11/2009 | Slattery et al. |
| 7,636,305 | B1 | 12/2009 | Taylor et al. |
| 7,660,290 | B2 | 2/2010 | Nagami et al. |
| 7,698,396 | B2 | 4/2010 | Aoyagi et al. |
| 7,804,781 | B2 * | 9/2010 | Xu .................. H04L 41/0631 370/242 |
| 7,822,837 | B1 | 10/2010 | Urban et al. |
| 7,860,016 | B1 | 12/2010 | Vijendra et al. |
| 7,894,461 | B2 * | 2/2011 | Pei .................. H04L 45/04 370/401 |
| 7,945,658 | B1 | 5/2011 | Nucci et al. |
| 7,975,045 | B2 * | 7/2011 | Underwood .......... H04L 12/66 709/223 |
| 7,990,892 | B2 | 8/2011 | Boucadair |
| 8,015,139 | B2 | 9/2011 | Bahl et al. |
| 8,130,767 | B2 | 3/2012 | Aitken et al. |
| 8,161,152 | B2 | 4/2012 | Ogielski et al. |
| 8,170,552 | B2 | 5/2012 | Patel et al. |
| 8,208,377 | B2 * | 6/2012 | Subramanian ........ H04L 45/04 370/230 |
| 8,214,876 | B2 | 7/2012 | Vaidyanathan |
| 8,228,815 | B2 | 7/2012 | Keromytis et al. |
| 8,254,273 | B2 | 8/2012 | Kaminsky et al. |
| 8,325,720 | B2 | 12/2012 | Gao et al. |
| 8,438,427 | B2 | 5/2013 | Beck et al. |
| 8,484,374 | B2 | 7/2013 | Zisapel et al. |
| 8,490,055 | B2 | 7/2013 | Basak |
| 8,521,904 | B1 | 8/2013 | Pei et al. |
| 8,542,612 | B1 * | 9/2013 | Uttaro .............. H04L 29/06183 370/255 |
| 8,549,124 | B2 | 10/2013 | Duggan et al. |
| 8,572,281 | B1 | 10/2013 | Jesuraj |
| 8,751,619 | B2 | 6/2014 | Tychon et al. |
| 8,971,323 | B2 | 3/2015 | Mithyantha et al. |
| 9,014,012 | B2 | 4/2015 | Jeyachandran et al. |
| 9,411,787 | B1 | 8/2016 | Lad |
| 2002/0120727 | A1 | 8/2002 | Curley et al. |
| 2002/0141400 | A1 | 10/2002 | DeMartino |
| 2002/0199016 | A1 | 12/2002 | Freedman |
| 2003/0174650 | A1 | 9/2003 | Shankar et al. |
| 2003/0236844 | A1 | 12/2003 | Kaler et al. |
| 2004/0046785 | A1 | 3/2004 | Keller |
| 2004/0221296 | A1 | 11/2004 | Ogielski et al. |
| 2005/0036487 | A1 | 2/2005 | Srikrishna |
| 2005/0114500 | A1 | 5/2005 | Monk et al. |
| 2005/0198269 | A1 * | 9/2005 | Champagne .......... H04L 45/00 709/224 |
| 2005/0222815 | A1 * | 10/2005 | Tolly ................ H04L 12/2697 702/185 |
| 2005/0243729 | A1 | 11/2005 | Jorgenson et al. |
| 2006/0023638 | A1 | 2/2006 | Monaco et al. |
| 2006/0098586 | A1 | 5/2006 | Farrell et al. |
| 2006/0291446 | A1 | 12/2006 | Caldwell et al. |
| 2007/0043861 | A1 | 2/2007 | Baron et al. |
| 2007/0162595 | A1 | 7/2007 | Samprathi |
| 2007/0250902 | A1 | 10/2007 | Vaidyanathan |
| 2008/0049777 | A1 | 2/2008 | Morrill et al. |
| 2008/0089347 | A1 | 4/2008 | Phillipi et al. |
| 2008/0155093 | A1 | 6/2008 | Dharmistan |
| 2008/0222287 | A1 | 9/2008 | Bahl et al. |
| 2008/0263188 | A1 * | 10/2008 | Awduche ............ H04L 43/065 709/223 |
| 2009/0055522 | A1 | 2/2009 | Shen et al. |
| 2009/0161556 | A1 | 6/2009 | Qian et al. |
| 2009/0204795 | A1 | 8/2009 | Nasuto et al. |
| 2009/0276771 | A1 | 11/2009 | Nickolov et al. |
| 2010/0002578 | A1 | 1/2010 | Fiorone et al. |
| 2010/0080129 | A1 | 4/2010 | Strahan et al. |
| 2010/0100627 | A1 | 4/2010 | Evans |
| 2010/0118714 | A1 * | 5/2010 | Labovitz ............ H04L 43/067 370/252 |
| 2010/0132039 | A1 | 5/2010 | Ji et al. |
| 2011/0145434 | A1 * | 6/2011 | Ringen ................ H04L 45/00 709/238 |
| 2011/0286418 | A1 | 11/2011 | Liu et al. |
| 2012/0017165 | A1 | 1/2012 | Gardner et al. |
| 2012/0151041 | A1 | 6/2012 | Gerber et al. |
| 2012/0191826 | A1 | 7/2012 | Gotesdyner et al. |
| 2012/0207161 | A1 | 8/2012 | Uppalli et al. |
| 2012/0239799 | A1 | 9/2012 | Wang et al. |
| 2013/0311832 | A1 | 11/2013 | LAD et al. |
| 2014/0029443 | A1 | 1/2014 | Bhavanam et al. |
| 2014/0181292 | A1 | 6/2014 | Venkataswami et al. |
| 2014/0280917 | A1 | 9/2014 | Lad et al. |
| 2014/0304407 | A1 | 10/2014 | Moon |

OTHER PUBLICATIONS

Author Unknown, Bgplay.js, What is BGPlay.js? Printed on Apr. 7, 2015.
Blunk et al., Multi-Threaded Routing Toolkit (MRT) Routing Information Export Format, Oct. 2011.
Lougheed et al., A Border Gateway Protocol (BGP), Jun. 1989.
Rekhter et al., A Border Gateway Protocol 4 (BGP-4), Jan. 2006.
Author Unknown, Ripe Network Coordination Centre, printed on Apr. 7, 2015.
Author Unknown, Route View 6447, Route Views Project Page, University of Oregon Route Views Project, Jan. 27, 2005.
Author Unknown, Routing Information Service (RIS), Oct. 7, 2013.
Vazquez et al., Internet Topology at the Router and Autonomous System Level, 2002.

* cited by examiner

MONITORING SERVICE AVAILABILITY USING DISTRIBUTED BGP ROUTING FEEDS

CROSS REFERENCE TO OTHER APPLICATIONS

This application claims priority to U.S. Provisional Patent Application No. 61/982,553 entitled MONITORING SERVICE AVAILABILITY USING DISTRIBUTED BGP ROUTING FEEDS filed Apr. 22, 2014, which is incorporated herein by reference for all purposes.

This application is a continuation in part of co-pending U.S. patent application Ser. No. 14/210,128 entitled DEEP PATH ANALYSIS OF APPLICATION DELIVER OVER A NETWORK filed Mar. 13, 2014, which is incorporated herein by reference for all purposes, which is a continuation of co-pending U.S. patent application Ser. No. 13/839,214 entitled CROSS-LAYER TROUBLESHOOTING OF APPLICATION DELIVERY filed Mar. 15, 2013, which is incorporated herein by reference for all purposes, which claims priority to U.S. Provisional Patent Application No. 61/649,473 entitled CROSS-LAYER VISIBILITY OF APPLICATION DELIVERY filed May 21, 2012, which is incorporated herein by reference for all purposes.

BACKGROUND OF THE INVENTION

Web services can be used to provide communications between electronic/computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Cloud computing generally refers to the use of computing resources (e.g., hardware and software) that are delivered as a service over a network (e.g., typically, the Internet). Cloud computing includes using remote services to provide a user's data, software, and computation.

Distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

BRIEF DESCRIPTION OF THE DRAWINGS

Various embodiments of the invention are disclosed in the following detailed description and the accompanying drawings.

DETAILED DESCRIPTION

Figure 1:
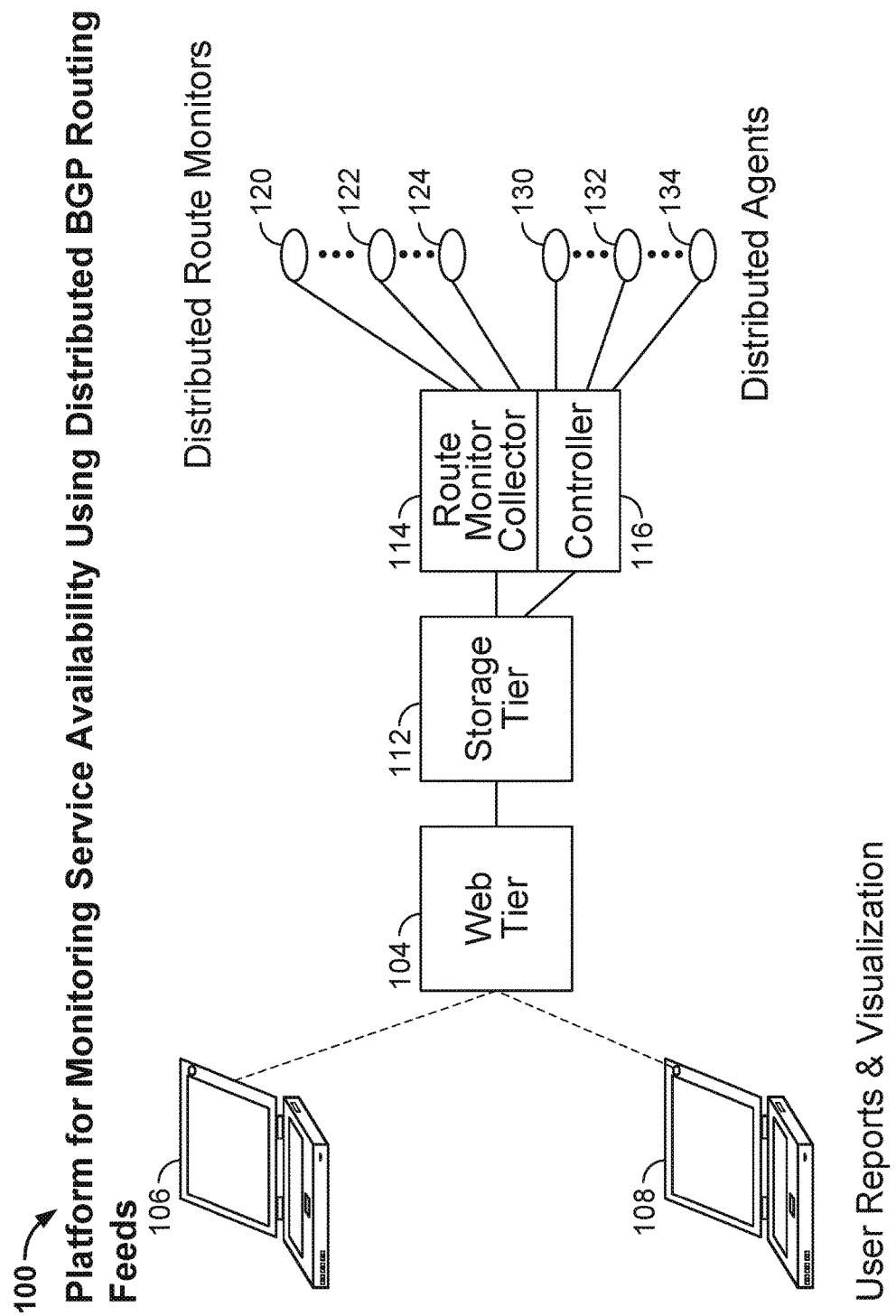
FIG. 1 illustrates a network diagram of a system architecture of a platform for monitoring service availability using distributed Border Gateway Protocol (BGP) routing feeds in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Cloud computing generally refers to the use of computing resources (e.g., hardware and software) that are delivered as a service (e.g., a web service available on the World Wide Web (WWW)) over a network (e.g., typically, the Internet). Cloud computing includes using remote services to provide a user's data, software, and computation.

Distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network, a user's client device, and/or intermediate network providers between the user's client device and the cloud-based/web-based service provider of a distributed application and/or web site can present significant challenges.

What are needed are new and improved techniques to monitor, visualize and troubleshoot the performance of cloud-based/web-based services (e.g., distributed applications and SaaS-based solutions available as web services via web sites and/or using other cloud-based implementations of distributed applications).

Overview of Techniques for Monitoring and Troubleshooting Service Availability Using Distributed Border Gateway Protocol (BGP) Routing Feeds Accordingly, techniques for monitoring service availability using distributed Border Gateway Protocol (BGP) routing feeds are disclosed.

In some embodiments, various techniques are provided for monitoring service availability using BGP routing feeds, such as for determining network communication problems associated with network communication access to cloud-based/web-based services. For example, a platform for identifying and/or determining performance problems associated with cloud-based/web-based services (e.g., a distributed application(s) delivered as a cloud-based/web-based service) can be provided, such as disclosed herein. As another example, the platform can generate reports that include various cross-layer visualizations that facilitate identifying and/or determining performance problems associated with service availability using BGP routing feeds to generate a visualization(s) of the routing layer and/or other network layers and/or other reporting information related to the BGP layer of the network communication access to the cloud/web service. As yet another example, various techniques described herein can be used to diagnose application delivery problems from cloud/web service providers, such as SaaS and/or other network delivered-based applications (e.g., web sites, online stores, cloud-based software, and/or other such network-based applications and/or services) to determine the causes or sources of the application delivery performance issues or problems.

In one embodiment, a route monitor is disclosed that analyzes the inter-domain routes of multiple routers (e.g., public and/or private (route) monitors) distributed across the Internet towards a specific IP network (e.g., prefix). For example, the route monitor can be provided as a component (e.g., a software module or plug-in) of a network monitoring and service availability monitoring platform, such as the network monitoring and service availability monitoring platform that is commercially available from ThousandEyes, Inc. and/or another commercially available and/or an open source network/service availability monitoring platform. The route monitor can monitor how network communication access from/to one or more services (e.g., cloud/web services) is being routed on the Internet according to the BGP protocol.

In an example implementation, the network monitoring and service availability monitoring platform includes a visualization component that enables navigation across different geographic locations and time, and filtering of events and/or a selected time frame(s) so that their root cause(s) can be determined. The route monitor can also collect BGP feeds from inside a customers' network (e.g., using one or more private monitors inside a customer's enterprise network) to augment the routing visibility relevant to the customer's network and access to cloud/web services of interest to the customer, such as further described below. For example, such an implementation can enable customers (e.g., subscribers or other users of the disclosed monitoring service/platform) of the network monitoring and/or service availability monitoring platform to not only understand how the external vantage points (e.g., using public monitors) can reach their (cloud/web) services (e.g., outside-in), but also how devices internal to the enterprise network can reach services hosted outside of their enterprise networks (e.g., inside-out), such as further described below.

As an example use case scenario, the network monitoring and service availability monitoring platform can generate reports and/or visualizations of such BGP routing to a cloud/web service to allow customers to better understand how specific services are being routed on the Internet according to the BGP protocol for identifying/troubleshooting performance issues related to network communication access to the specific services.

As another example use case scenario, the network monitoring and service availability monitoring platform can generate reports and/or visualizations of such BGP routing to a cloud/web service to facilitate network capacity planning for customers related to network communication access to the specific services.

In some embodiments, a system, process, and/or computer program product for monitoring service availability using distributed BGP routing feeds includes collecting BGP routing data from a plurality of distributed route monitors; aggregating the collected BGP routing data into bins; and determining a BGP metric based on the aggregated and collected BGP routing data. Example BGP metrics include a reachability metric, number of path changes metric, or a number of BGP updates metric. For example, the plurality of distributed route monitors can include a public route monitor(s) and a private route monitor(s). In an example implementation, each of the bins corresponds to a predetermined period of time (e.g., 15-minute rounds or some other time period), and the BGP metric(s) can be determined per bin.

In one embodiment, the BGP metric(s) based on the aggregated and collected BGP routing data is reported. For example, the report can include a graphical visualization of a plurality of routes (e.g., a topology graph of routes) based on the aggregated and collected BGP routing data. As another example, the report can include a graphical visualization of an application delivery state for a plurality of application delivery layers, in which the plurality of application delivery layers includes a routing layer (e.g., BGP layer). As yet another example, the report can include a graphical visualization of an application delivery state for a plurality of application delivery layers that includes a cross-layer correlation of a path trace with a routing layer to identify where network data loss is occurring along a network path (e.g., the report can also provide a mapping between a host name(s), IP address(es), and a BGP prefix(es)).

In some embodiments, a system, process, and/or computer program product for monitoring service availability using distributed BGP routing feeds includes monitoring a first layer of a network in communication with a distributed application endpoint for a predetermined period of time by performing a network test using an agent; monitoring a routing layer of the network in communication with a distributed application endpoint for a predetermined period of time using a route monitor (e.g., the route monitor(s) can collect BGP routing data for the predetermined period of time); and generating a cross-layer report for the predetermined period of time that includes network performance data for the first layer of the network and for the routing layer of the network in communication with the distributed application endpoint. For example, a request can be received to monitor the distributed application endpoint, and the cross-layer report can include a mapping of a plurality of hostnames to IP addresses and a mapping of IP addresses to BGP prefixes, and the cross-layer report can also include a cross-layer visualization that displays an overlap of the routing layer with monitored packet forwarding (loss) data.

In one embodiment, whether a route path change and/or a reachability change occurred during the predetermined period of time is determined. For example, whether an inability to access the distributed application endpoint during the predetermined period of time is a result of a route change or a route reachability change during the predetermined period of time can be determined using the disclosed techniques, as further described below.

As another example, route distribution (e.g., validating multi-homing) can be verified using the disclosed techniques by monitoring inbound traffic to an enterprise network using a plurality of public route monitors; determining a distribution of BGP routes to the enterprise network to determine a route distribution among a plurality of network service providers (e.g., Internet Service Providers (ISPs)); and displaying the determined route distribution, as further described below.

As yet another example, a root cause of a routing change problem can be determined using the disclosed techniques for internal BGP visibility by determining whether the root cause is a result of a routing change inside an enterprise network or outside the enterprise network, as further described below.

As also further described below, the disclosed techniques for internal BGP visibility can also be applied to determine routes from devices internal to the enterprise network to reach external distributed applications (e.g., SaaS provider distributed applications, web sites/services, etc.) using a private route monitor(s).

In one embodiment, a system, process, and/or computer program product for monitoring service availability using distributed BGP routing feeds further includes collecting BGP routing feeds from a public monitor and a private monitor. For example, the BGP routing feeds collected from the public monitor and the private monitor can be aggregated and analyzed to provide insights into the BGP layer of the network communication access to the cloud/web service, such as further described below.

In one embodiment, a system, process, and/or computer program product for monitoring service availability using distributed BGP routing feeds further includes outputting the graphical visualization of the BGP layer of the network communication access to the cloud/web service.

In one embodiment, a system, process, and/or computer program product for monitoring service availability using distributed BGP routing feeds further includes providing cross-layer troubleshooting of application delivery by collecting test results from a plurality of distributed agents for a plurality of application delivery layers; and generating a graphical visualization of an application delivery state based on the test results for the plurality of application delivery layers (e.g., different application delivery layers, including the BGP layer and one or more other network layers, such as further described below).

For example, the graphical visualization of the application delivery state can facilitate cross-layer troubleshooting of problems (e.g., associated with application delivery of a distributed application). As another example, the graphical visualization of the application delivery state can facilitate cross-layer visualization and troubleshooting of application delivery (e.g., associated with application delivery of a distributed application, which can identify and/or facilitate diagnosing of causes of application delivery problems).

In one embodiment, the graphical visualization of the application delivery state based on the test results for the plurality of application delivery layers facilitates cross-layer visualization and troubleshooting of problems (e.g., associated with application delivery of a distributed application over a network via different application delivery layers, including the BGP layer and one or more other network layers, such as further described below).

In one embodiment, the graphical visualization of the application delivery state based on the test results for the plurality of application delivery layers facilitates cross-layer troubleshooting of application delivery by providing for correlation of the test results across a plurality of layers (e.g., over a network via different application delivery layers, including the BGP layer and one or more other network layers, such as further described below).

In one embodiment, the graphical visualization of the application delivery state based on the test results for the plurality of layers facilitates cross-layer troubleshooting of application delivery by providing for correlation of the test results across a plurality of layers using a space domain and/or a time domain (e.g., over a network via different application delivery layers, including the BGP layer and one or more other network layers, such as further described below).

In one embodiment, a system, process, and/or computer program product for monitoring service availability using distributed BGP routing feeds further includes using software agents to collect information from different points in a network across different layers in the application delivery (e.g., of a distributed application), as further described herein with respect to various embodiments. For example, such information can be collected and aggregated by centralized collectors and aggregators and presented to a user as a Software as a Service (SaaS). As an example, different layers can be correlated using one or more of the following: a monitored object, time, and location.

For example, various techniques described herein allow for diagnosing SaaS applications, such as for cloud-based distributed applications, using, for example, a lightweight agent and public/private routing monitors, as further described herein with respect to various embodiments. In particular, various techniques described herein allow users (e.g., subscribers, customers, or other users of the platform) to drill down to identify problems and locations whether at different layers (e.g., a network, transport, and/or application layer, including the routing/BGP layer, such as further described below) to correlate across application delivery layers to determine whether, for example, network issues are affecting the performance of a distributed application(s), as further described herein with respect to various embodiments. For example, such techniques can be applied to both internal network diagnostics (e.g., for an organization's internal network) and/or external network diagnostics (e.g., for a web site accessed across the Internet, such as for a cloud-based distributed application).

As another example, techniques disclosed herein can be used for correlating cross-layer network data and visualizing such cross-layer network data using BGP routing information. As such, users can make better sense of such information and the correlation and presentation of such information can more clearly reveal if a BGP routing issue at a particular time interval may be a cause of various network problems during that time interval. In an example case, HTTP measurement errors may actually be a result of this BGP routing issue, such as when looking at data path loss errors in which there are random drops at random locations, a user can then use the correlated cross-layer network data as disclosed herein to determine if the problem is at the BGP level (e.g., there may be no announced/advertised route to get to that network AS number, as that will cause the router(s) to just drop such packets for which it has no routing information).

As further described below, these and various other features and techniques are disclosed for monitoring service availability using distributed BGP routing feeds.

A Platform for Monitoring and Troubleshooting Service Availability Using Distributed BGP Routing Feeds In one embodiment, a platform for monitoring service availability using distributed BGP routing feeds includes a distributed set of routing monitors to collect BGP routing feeds across the Internet and one or more enterprise networks. For example, a plurality of public and private routing monitors can be configured to provide BGP routing feeds to a route monitoring component of the platform, such as further described below.

In one embodiment, a platform for monitoring service availability using distributed BGP routing feeds also includes a distributed framework to distribute tests across different agents in the Internet. For example, agents can be executed on hosted providers using cloud computing distributed across multiple ISPs, which are controlled by agent controllers to perform one or more tests as further described herein, in which the test results can be collected for correlation and analysis, as further described below. In an example implementation, agents can be implemented as computing resources that are controlled, and, for example, can be either virtual or dedicated servers. Agents can be distributed across different geographies and networks, for example, distributed agents can be distributed to mostly Tier-1 and Tier-2 networks to avoid the noise of bad connectivity of last mile connections.

An example of a system architecture of a platform for monitoring service availability using distributed BGP routing feeds is shown in FIG. 1 as described below.

FIG. 1 illustrates a network diagram of a system architecture of a platform for monitoring service availability using distributed Border Gateway Protocol (BGP) routing feeds in accordance with some embodiments. In particular, FIG. 1 illustrates an environment in which a platform for monitoring service availability using distributed BGP routing feeds 100 includes distributed route monitors 120, 122, and 124 that communicate routing feeds to a route monitor collector 114 (e.g., a route monitor component of platform 100, such as further described below). For example, the distributed route monitors can include public monitors and private monitors that are distributed across various geographies and/or networks (e.g., including, in some cases, private enterprise networks) for collecting BGP routing feeds, such as further described below. Route monitor collector 114 stores the collected BGP routing feed data in a storage tier 112 (e.g., providing permanent storage) that can be aggregated (e.g., into bins/rounds as further described below) and then used by a web tier 104 to generate visualizations and reports to users accessing the platform 100 using client devices (e.g., computers, laptops, smartphones, and/or various other computing devices that can execute, for example, a web browser to access the platform (100) for monitoring service availability using distributed BGP routing feeds), such as further described below.

As also shown, platform 100 includes distributed agents 130, 132, and 134 that are in communication with a controller(s) 116 (e.g., a controller component of platform 100, such as further described below). The distributed agents can include agents that are distributed across various geographies and/or devices for performing different types of tests and/or targeting different sites, locations, and/or metrics that collect data based on the configured test. The distributed agents send test data results/responses to controller(s) 116 (e.g., agent controllers). Controller 116 stores the test data results/responses in storage tier 112 (e.g., providing permanent storage) that can be used by web tier 104 to generate visualizations and reports to users accessing the platform 100 using client devices (e.g., computers, laptops, smartphones, and/or various other computing devices), such as further described below.

In one embodiment, the plurality of distributed route monitors includes public monitors and private monitors, and the route monitor component collects BGP routing feeds from each of the public monitors and private monitors. In one embodiment, the BGP routing feed data collected from the plurality of distributed public and private monitors is aggregated and stored in a storage tier (e.g., which can include a database or another type of data store). In one embodiment, the plurality of distributed agents is controlled by an agent controller. In one embodiment, the network performance test results from the plurality of distributed agents for the plurality of layers are stored in a storage tier (e.g., which can include a database or another type of data store). In one embodiment, the graphical visualization of network performance is generated by the platform for monitoring service availability using distributed BGP routing feeds 100, such as shown in FIG. 1.

For example, a report can be output to a user to present the collected and analyzed cross-layer application delivery information of a distributed application. Example reports can include various visualizations and/or diagnostic information as further described herein with respect to various embodiments. For example, the report can facilitate troubleshooting application delivery associated with the distributed application to determine whether performance problems are the result of the cloud provider of the distributed application, the customer's own internal IT network, a user's client device, and/or intermediate network providers between the user's client device and the cloud provider. For instance, the report and/or visualization can indicate that a network delay/loss problem during a certain period of time between a customer's enterprise network and a cloud/web service was a result of a BGP routing change(s) and/or other BGP related issues that occurred outside of the customer's enterprise network, such as further described below with respect to example use case scenarios. The report can also include recommendations to the user to resolve any such determined application delivery problems associated with the distributed application. In some cases, the report can also be provided to a third party, such as the SaaS provider of the distributed application and/or a network provider, which can be provided as information to indicate the source of such determined application delivery problems associated with the distributed application.

In the example shown, the user of client device 106 (hereinafter referred to as "Bob") is employed as an IT manager of a distributed application company ("SaaS Company"). The user of client device 108 (hereinafter referred to as "Alice") is employed as an IT manager of a national company ("ACME Company"). As will be described in more detail below, Bob and Alice can each access the services of platform 100 (e.g., platform for monitoring service availability using distributed BGP routing feeds) via web tier 104 over a network, such as the Internet. The techniques described herein can work with a variety of client devices 106-108 including, for example, personal computers, tablet computers, smartphones, and/or other computing devices.

In one embodiment, platform 100 generates various reports based on results of the network performance tests to facilitate cross-layer visibility and troubleshooting of application delivery associated with a distributed application(s), as further described herein. In one embodiment, platform 100 includes a data store, such as storage tier 112 for storing collected and aggregated BGP route feed data and also for storing results of the network performance tests and/or the reports.

In one embodiment, a set of agent controllers 116 is provided as shown to send various tests (e.g., such as the various test described herein with respect to various embodiments) to the distributed agents for execution by the distributed agents. For example, agents can be executed on hosted providers using cloud computing distributed across multiple Internet Service Providers (ISPs), which are controlled by agent controllers to perform one or more tests as further described herein, in which the test results can be collected for correlation and analysis, as further described herein with respect to various embodiments.

In one embodiment, the tests are configured through a web interface by a user. For example, typical parameters can include the frequency of various tests, the target of the tests, and the agents (e.g., or locations) where the tests are to be performed. The test parameters can be sent from the controller (e.g., agent controllers 116) to the distributed agents after an agent checks-in (e.g., using a pull mechanism). After an agent executes a test, the agent can export the test result(s) back to the controller. The controller can then provide the results back to a data store (e.g., storage tier 112) for permanent storage (e.g., or temporary storage). Besides periodic tests, a controller can also send on-demand tests to an agent(s) through, for example, a Remote Procedure Call (RPC) call for immediate or on-demand execution.

In one embodiment, platform 100 is a scalable, elastic architecture and may comprise several distributed components, including components provided by one or more third parties. Further, when platform 100 is referred to as performing a task, such as storing data or processing data, it is to be understood that a sub-component or multiple sub-components of platform 100 (whether individually or in cooperation with third party components) may cooperate to perform that task.

In one embodiment, tests include various types of tests to facilitate cross-layer visibility and troubleshooting of application delivery associated with a distributed application(s), as further described herein. Example network tests include data path measurement tests, routing path measurement tests, and end-to-end network metrics tests. Example DNS tests include per name server testing and Domain Name System Security Extensions (DNSSEC) bottom-up validation tests. Example HTTP tests include testing of steps of a Uniform Resource Locator (URL) fetch. Example page load tests include testing of a load of an entire web page using a web browser (e.g., a typical web browser). Example transaction tests include performing a multi-step scripted transaction from a web browser (e.g., a typical web browser).

These and various other types of tests to facilitate cross-layer visibility and troubleshooting of application delivery associated with a distributed application(s) are discussed in greater detail below and as similarly disclosed in co-pending U.S. Patent Application Publication No. US20130311832 entitled CROSS-LAYER TROUBLESHOOTING OF APPLICATION DELIVERY filed Mar. 15, 2013, which is incorporated herein by reference for all purposes.

Cross-Layer Correlation

In the next sections, various techniques for allowing users (e.g., Bob and Alice) to easily navigate between different layers of data are described in accordance with some embodiments. For example, platform 100 can provide users with a natural flow of action for root cause identification of problems as further described herein with respect to various embodiments.

Slicing Data Across Time—Rounds and Timeline

In one embodiment, tests aggregate data over certain time intervals (e.g., small time intervals, such as 15-minute time windows or some other period/increment of time), referred to as rounds/bins or time windows. In one embodiment, a round/bin includes one sample of data from each agent (e.g., each agent can be placed in a different geographical location) for a given test. In one embodiment, data over each round/bin is aggregated for a set of agents (e.g., all the agents) and, for example, can be shown on a timeline.

In one embodiment, BGP route data feeds are collected and aggregated for a set of distributed public/private monitors, and the aggregated BGP route feed data (e.g., aggregated for a period of time into bins, such as 15-minute time windows, such as further described below) can be shown on a timeline.

In one embodiment, a timeline is implemented as a navigation widget that enables users to view the aggregate BGP route feed data over time (e.g., and not just a BGP event-by-event view of the BGP route feed data) and to click on a specific point in time (e.g., time window/interval) for a detailed drill down (e.g., to view specific BGP metrics aggregated from the collected BGP route feeds for that time window/interval). For example, a user can be provided with several BGP-related metrics to choose from, and a timeline can be associated with one or more metrics, such as further described below.

In one embodiment, a timeline is implemented as a navigation widget that enables users to view the aggregate behavior of all of the agents, including aggregated BGP route feed data as similarly described above, over time (e.g., or just an individual agent) and to click on a specific point in time for a detailed drill down (e.g., to view specific cross-layer network test related data at a specified time or time window/interval). For example, a user can be provided with several metrics to choose from, and a timeline can be associated with one or more metrics.

Compound Tests

In one embodiment, some tests are composed of multiple subtests that are run at the same time. For example, the subtests can each be different and associated with different layers of visibility. Performing different active tests at the same time for different layers allows for switching between subtests while keeping the same test and round (e.g., and eventually the same agent location). For instance, a test can include an HTTP subtest and a network subtest at the same time. Then the user can navigate from HTTP metrics, to end-to-end network metrics, all the way down to individual router hop metrics (e.g., by inspecting the data path). For example, this can be useful to identify/classify problems that are network induced versus problems that are back-end related.

Correlating Different Layers

In one embodiment, when switching between views (e.g., or layers), the context is maintained, such as the following: (1) the test, (2) the round, and (3) the location (e.g., the agent ID or the agent location). More formally, each layer L0 has an associated vector of features, referred to as the context vector, $C_{L0}$, that includes all dimensions that uniquely identify a view in layer L0. When moving between layer L0 and L1, a function is applied to $C_{L0}$ to provide $C_{L1}$, such as for example, the following:

$C_{L1}=F_{L0 \rightarrow L1}(C_{L0})$. We can think of F as a matrix of functions, and the indexes are the current layer, and the next layer the function is mapping to.

In one embodiment, a Graphical User Interface (GUI) is provided that can allow a user (e.g., Bob or Alice) to navigate between different layers, such as to jump to different application delivery layers (e.g., path visualization, BGP metrics, BGP route visualization, etc.) and web layers (e.g., basic HTTP, etc.). In one embodiment, a set of layers is correlated, and reports including visualizations that present results of tests performed at the different correlated layers can be accessed, such as using hyperlinks in a GUI menu that can encode the context vectors as GET parameters in the URLs. For example, users can jump to Path Visualization, BGP Metrics, BGP Route Visualization, and Basic HTTP views while maintaining the context as discussed above.

Table 1 (below) shows a transition table between different layers, indicating from which layers (rows) is it possible to jump to (columns) in accordance with some embodiments.

TABLE 1

Transitions between layers, * indicates transition is only available for compound tests.

| FROM/TO | Net: End-to-end | Net: Path Viz | BGP | DNS: Server Metrics | Basic HTTP | Page Load |
| --- | --- | --- | --- | --- | --- | --- |
| Net: End-to-end | — | Yes | Yes | Yes* | Yes* | — |
| Net: Path Viz | Yes | — | Yes | Yes* | Yes* | — |
| BGP | Yes | Yes | — | Yes* | Yes* | — |
| DNS: Server Metrics | Yes* | Yes* | Yes* | — | — | — |
| Basic HTTP | Yes* | Yes* | Yes* | — | — | Yes* |
| Page Load | — | — | — | — | Yes* | — |

Application Delivery Layers

The next sections describe the layers involved in application delivery including the BGP layer and how route data is collected and analyzed at each stage in accordance with some embodiments.

Network Performance Analysis Based on Routing Paths

Overview of the Border Gateway Protocol (BGP)

The Internet generally includes a myriad of independent networks organized into Autonomous Systems (AS). Each Autonomous System (AS) typically represents an independent administrative domain managed by a single organization and is uniquely identified by a 4-byte Autonomous System Number (ASN) for routing on the Internet (e.g., AS 7018 is the ASN for AT&T, AS 701-703 is the ASN for Verizon, etc.).

The Border Gateway Protocol (BGP) is a standard routing protocol (e.g., as specified in IETF RFC 1105, available at https://www.ietf.org/rfc/rfc1105, and IETF RFC 4271, available at https://www.ietf.org/rfc/rfc4271) used to exchange routing information between different Autonomous Systems (AS) (e.g., which generally corresponds to the control plane between different networks, such as between AT&T networks and Verizon networks, and/or between other such networks). BGP is generally used to announce/advertise reachability to a set/range of IP addresses. BGP defines more than just physical interconnections; BGP is also used to advertise which routes are possible based on policies defined by other considerations, such as traffic engineering, maintenance, and commercial transit and peering agreements.

An AS is generally an independently managed network domain (e.g., an organization, such as Hewlett Packard Company, Dell Inc., or another private or public/government entity, as well as network service providers on the Internet such as AT&T and Verizon, can maintain network domains, each of which is associated with a particular AS number, such as AS number 3614, which is a unique identifier for the entity's (enterprise) network domain), typically having a one-to-one mapping to an organization/entity, as similarly described above.

A BGP prefix, or also referred to as just prefix, generally refers to a range of IP addresses (e.g., a group of IP addresses). A prefix is typically specified by a combination of an IP address and a prefix length that specifies how many initial bits in the IP address are relevant. For example, 10.1.1.0/24 is a prefix, in which 10.1.1.0 is the IP address, and 24 is the prefix length. As a result, this prefix specifies the following range of IP addresses: 10.1.1.0 through 10.1.1.255.

Figure 2:
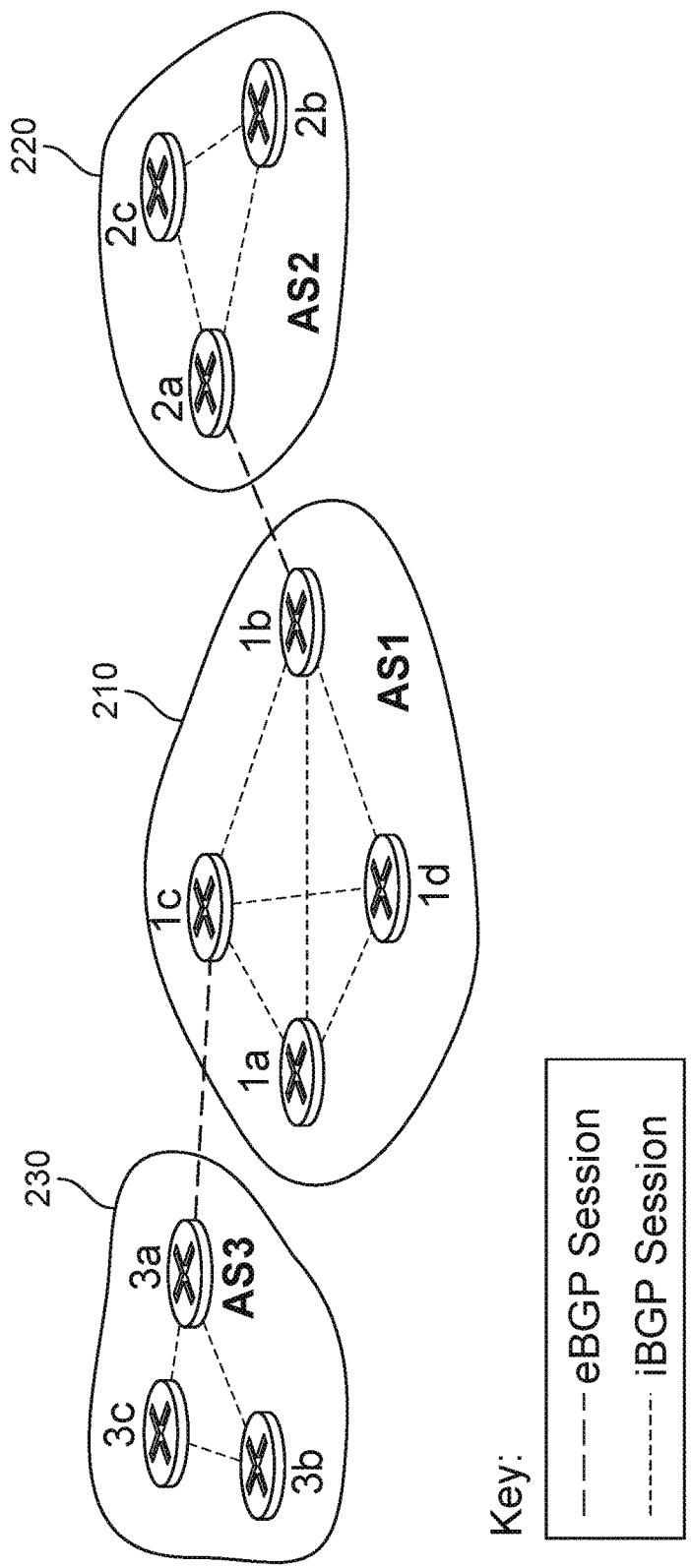
FIG. 2 is an example network diagram illustrating a plurality of Autonomous Systems (AS).

FIG. 2 is an example network diagram illustrating a plurality of Autonomous Systems (AS). Referring to FIG. 2, AS1 shown at 210, AS2 shown at 220, and AS3 shown at 230 each include routers (e.g., border routers) in communication using external Border Gateway Protocol (eBGP) communications (e.g., eBGP sessions) between routers of different AS (e.g., eBGP sessions can be used for inter-AS communications). As also shown, each of AS1, AS2, and AS3 include routers in communication using internal Border Gateway Protocol (iBGP) communications (e.g., iBGP sessions) for communications internal to each AS (e.g., iBGP sessions can be used for intra-AS communications). Generally, in accordance with the BGP protocol, routers advertise eBGP updates to their neighbors within their AS, but not their iBGP updates.

The BGP protocol uses BGP messages to communicate routing information via BGP sessions. For example, BGP messages can provide routing information for individual prefixes. BGP messages originate from the traffic destination outwards. As such, BGP message propagation follows the opposite direction of traffic propagation.

Border routers in different AS can connect to each other using the external Border Gateway Protocol (eBGP) (e.g., as specified in the standard BGP protocol). The BGP is used to announce/advertise reachability to a set/range of IP addresses (e.g., or prefix, as similarly described above). Typically, a BGP prefix is not less than a /24 address space (e.g., effectively to support routing paths to an address space/subnet of 156 IP addresses or greater), which facilitates maintaining BGP routing tables (e.g., global Internet routing tables), or also referred to as just routing tables, to a manageable size (e.g., routing tables generally have approximately 500,000 active entries/routes as of calendar year 2015, which is a trend that is generally increasing every year over the past 25 years).

Each AS typically includes a set of border routers (e.g., border routers 2*a*-2*c* of AS2 as shown at 220 in FIG. 2) that can connect to each other in a full mesh using the internal Border Gateway Protocol (iBGP) (e.g., as specified in the standard BGP protocol). For example, iBGP is typically used between the routers in the same Autonomous System (AS) (e.g., reflectors and confederations can be used to relax this constraint).

Collecting BGP Routing Information

In one embodiment, BGP route data collection is disclosed for collecting BGP routing information as discussed below. For example, BGP route data collection can be implemented using public route monitors and private route monitors for collecting BGP routing information as further described below.

Figure 3:
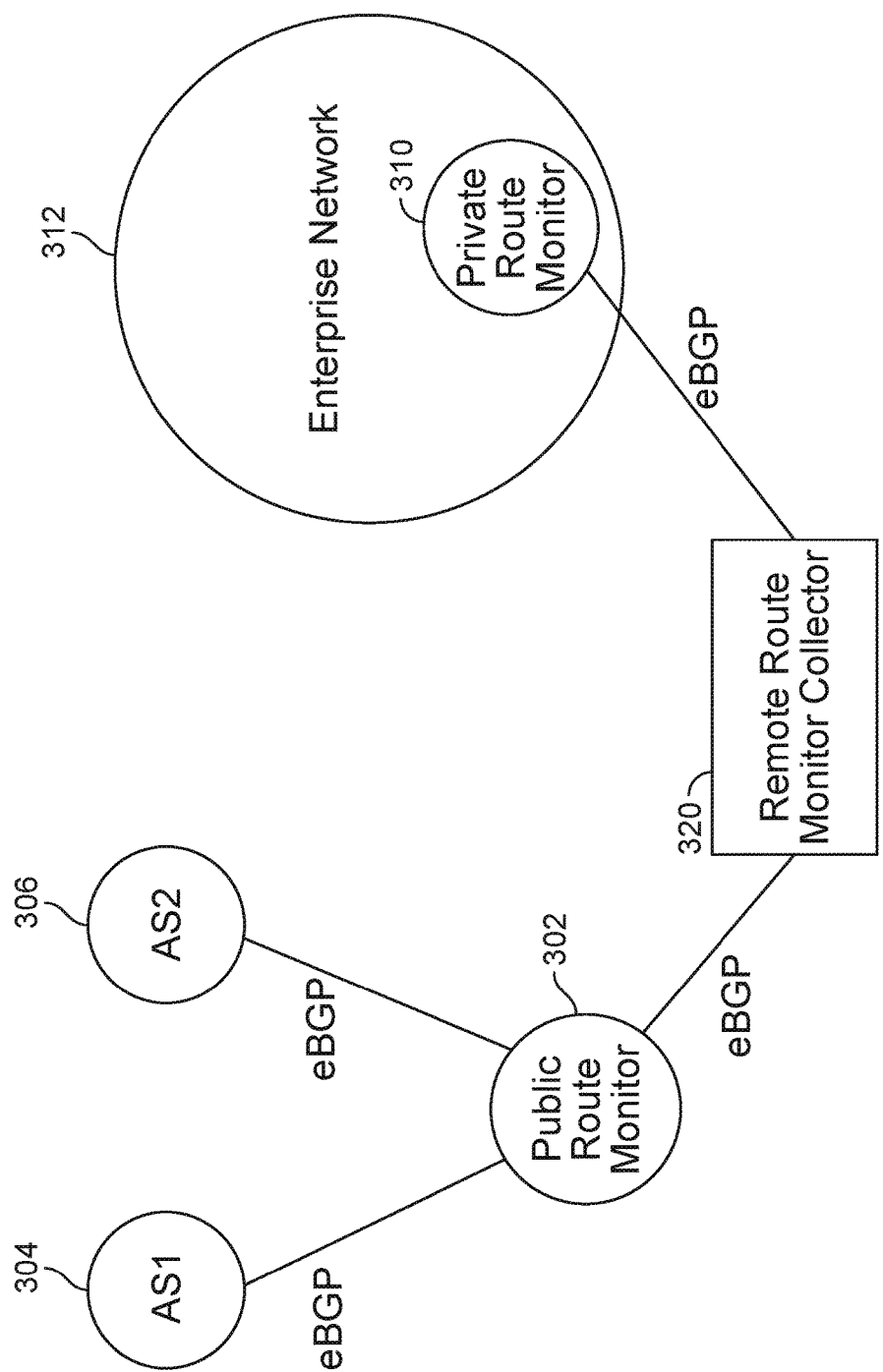
FIG. 3 is a network diagram illustrating public and private route monitors for collecting BGP routing information for monitoring service availability using distributed BGP routing feeds in accordance with some embodiments.

FIG. 3 is a network diagram illustrating public and private route monitors for collecting BGP routing information for monitoring service availability using distributed BGP routing feeds in accordance with some embodiments. In one embodiment, both public route monitors and private route monitors are used to collect BGP route data for monitoring service availability using distributed BGP routing feeds, as further described below.

In one embodiment, a public (route) monitor is a router that establishes a BGP session with a collector (e.g., a route monitor collector, such as route monitor collector 114 as shown in FIG. 1, or open projects provide such collectors and make such collected BGP data publicly available) to send BGP routing updates and BGP routing table transfers. For example, the collector can be implemented as a BGP routing daemon that has multiple sessions established with public monitors, and can periodically archive such updates and routing tables into disk for storage (e.g., this data can then be processed and written into a database). As further described below, there are several projects that make collector data publicly available, including RouteViews (e.g., available at http://www.routeviews.org) and RIPE-RIS (e.g., available at http://www.ripe.net/ris).

In one embodiment, a private (route) monitor is a router located inside a given entity's network (e.g., a customer's/subscriber's enterprise network). For example, one or more routers inside the entity's network can be configured to establish BGP sessions with a collector (e.g., a route monitor collector, such as route monitor collector 114 as shown in FIG. 1). For example, the collector can be implemented as a BGP routing daemon that has multiple sessions established with private monitors, and can periodically archive such updates and routing tables into disk for storage (e.g., this data can then be processed and written into a database).

Referring to FIG. 3, a public route monitor 302 (e.g., a public monitor) collects BGP routing information from a plurality of AS, shown as AS1 at 304 and AS2 at 306. For example, the public monitor can collect BGP routing information periodically via an eBGP session with a border router of each of AS1 and AS2. As further described below, BGP routing feeds can include collecting BGP routing information from distributed public monitors.

As similarly described above, eBGP sessions are used between respective routers in each of the AS systems to provide updates (e.g., if eBGP routing tables have been updated). The eBGP routing table data is provided as open projects, RouteViews and/or RIPE-RIS, which make such eBGP routing table data publicly available.

In one embodiment, BGP routing information is collected from public BGP data repositories that collect, aggregate, and archive routing information from a plurality of routers (e.g., hundreds of routers) across the Internet using public monitors, such as further described below. For example, BGP route information can be collected from RouteViews (RV) (e.g., RV can be used for collecting BGP route information for the Internet in the United States) and/or RIPE-RIS (e.g., Routing Information Service, which can be used for collected BGP route information for the Internet in Europe), which collect and publish BGP route information for the Internet.

As also shown in FIG. 3, a private route monitor 310 (e.g., a private monitor) is a router inside an enterprise network 312 in communication with a remote collector shown as remote route monitor collector 320 via e-BGP sessions (e.g., in an example implementation, remote route monitor collector 320 can be implemented using route monitor collector 114 as shown in FIG. 1). A main difference between a public monitor and a private monitor is that routing feeds from the private monitor are generally not publicly accessible. As further described below, BGP routing feeds can also include collecting BGP routing information from distributed private monitors. For example, private monitors can be used to represent BGP routing information for one or more entities that are subscribers (e.g., for subscriber enterprise network domains) to the monitoring service availability using distributed BGP routing feeds, such as further described below. As an example, one or more routers in a subscriber's enterprise network (e.g., a router in each of the subscriber's sites/data centers/geographies, etc.) can be configured to have eBGP sessions with the remote route collector (e.g., such that the remote collector can receive eBGP routing table data for the enterprise network via eBGP sessions (multi-hop TCP sessions)).

For example, by looking at the AS_PATH BGP attribute of each message sent from a router R, the routing path R was using at each time can be determined. In addition, this information can also be used to determine when a certain destination IP address (e.g., or prefix) is/was not reachable from R, such as further described below. As described herein with respect to various embodiments, the BGP route information can be correlated with various other layers of network information to allow for visualization of this data and analysis of this data in a manner that facilitates cross-layer visibility and troubleshooting of application delivery (e.g., to determine if a problem is caused by a BGP routing information related problem, data path packet loss related problem (e.g., congestion), HTTP related problem, DNS related problem, and/or some other network-related problem).

Historic BGP routing tables and messages are typically archived in a standard format for analysis purposes (e.g., using the Multithreading Routing Toolkit (MRT) export format, which is a compressed data format that is specified in IETF RFC 6396, available at https://tools.ietf.org/html/rfc6396). In one embodiment, public monitors collected BGP route data and private monitors collected route data is stored in a common and/or standard format, such as the MRT format.

In one embodiment, private BGP monitors provide routing information on how entities (e.g., customers/subscribers to the monitoring service availability using distributed BGP routing feeds) reach external sites/services over the Internet. For example, private monitors can identify the routes that are utilized by a given entity (e.g., a device within the enterprise network of the entity, such as ACME Company) reach a given distributed application, such as a web site/service (e.g., SaaS providers, such as salesforce.com, google.com, and/or other web site/service providers).

In one embodiment, public monitors provide information on how external users can reach a given customer's/subscriber's data centers/devices. For example, public monitors can identify the routes that are utilized to reach a given distributed application, such as a web site/service (e.g., SaaS providers, such as salesforce.com, google.com, and/or other web site/service providers).

As similarly described above, BGP routes are generally advertised/available to facilitate interconnectivity of devices across the Internet. For example, the pinterest.com website domain resolves to the IP address 23.23.131.240. An examination of routing tables for announced address blocks that cover this IP address indicates that this IP address falls under IP address block 23.22.0.0/15 announced by AS 14618 belonging to Amazon, as shown below.

$whois -h whois.cymru.com "-v 23.23.131.240"
AS|IP|BGP Prefix|CC|Registry|Allocated|AS Name
14618|23.23.131.240|23.22.0.0/15|US|arin|2011-09-19|AMAZON-AES—Amazon.com, Inc.

By performing an analysis of BGP routing information available at a RouteViews route server (e.g., available at telnet://route-views.routeviews.org), different AS paths available to reach the IP address block 23.22.0.0/15 can be determined. As shown in the case below, there are 31 different routes that are available to reach the destination. However, the router only selects one route, generally referred to as the BGP best path, which is selected after determining several route attributes pursuant to the BGP protocol, including BGP Local Preference and AS Path length.

route-views>sh ip bgp 23.23.131.240
BGP routing table entry for 23.22.0.0/15, version 636446191
Paths: (31 available, best #8, table Default-IP-Routing-Table)
  Not advertised to any peer
  3277 39710 9002 16509 14618
  194.85.102.33 from 194.85.102.33 (194.85.4.4)
  Origin IGP, localpref 100, valid, external
  Community: 3277:39710 9002:9002 9002:64789
  852 16509 14618
  154.11.98.225 from 154.11.98.225 (154.11.98.225)
  Origin IGP, metric 0, localpref 100, valid, external
  Community: 852:180
  3356 16509 14618
  4.69.184.193 from 4.69.184.193 (4.69.184.193)
  Origin IGP, metric 0, localpref 100, valid, external Community: 3356:3 3356:22 3356:100 3356:123 3356:575 3356:2006 65000:0 65000:7843
  . . .
  BGP/Routing Metrics In one embodiment, BGP data collection can be used to determine BGP metrics (e.g., also referred to herein as routing metrics, which can be aggregated over time in bins/rounds) as discussed below. For example, various BGP metrics can be determined from BGP routing information collected using the BGP data collection techniques disclosed herein. As also further described below, BGP/routing metrics can be applied to generate various BGP visualization and/or reporting, which can facilitate cross-layer troubleshooting and/or service monitoring using distributed BGP data feeds as disclosed herein.

In one embodiment, collected and aggregated BGP data is organized by n-tuples. In an example implementation, the BGP data is organized by a 3-tuple (monitor, prefix, round). In this example 3-tuple, the monitor parameter identifies the source of the route, the prefix parameter identifies the destination network, and the round parameter identifies a round (e.g., a bin) over which the BGP data is aggregated.

In one embodiment, BGP data is processed for prefixes of interest (e.g., targets/destinations of interest to a given customer/subscriber of the disclosed service). This technique generally allows for a subset of the BGP data to be processed. In an example implementation, customers (e.g., an IT/network admin) can input prefixes of interest (e.g., salesforce.com, google.com, etc.) using a BGP test (e.g., IT/network admin inputs BGP prefixes of interest). In another example implementation, the prefixes of interest can be determined automatically by converting hostnames to IP addresses from different agents, and further mapping IP addresses to prefixes. In some cases, a combination of automated and manual entry and/or review of automated techniques can be implemented to determine prefixes of interest for applying the disclosed techniques for generating BGP metrics using the collected BGP data.

In one embodiment, BGP data is collected and aggregated to provide BGP metrics per round. For example, a round can refer to a time interval/window (e.g., 15-minute interval of time or another predetermined period of time) over which BGP data is collected and aggregated.

The aggregation over time bins can provide a more user understandable view of the BGP data over time and facilitate service monitoring using distributed BGP data feeds, such as further described herein. For example, aggregating the collected BGP data over given periods of time facilitates enhanced reporting and visualization of the BGP data (e.g., as opposed to existing BGP data tools that merely attempt to show BGP data per event/change, such as the BGPlay tool that provides event-by-event data, available at http://bgplayjs.com/ and http://bgplay.routeviews.org/). As such, a bin of metrics for each n-minute window of BGP data can capture various BGP metrics, including, for example, path changes, reachability, and number of BGP updates, as further described below.

In one embodiment, a plurality of different BGP/routing metrics is generated using the collected and aggregated BGP data. Example BGP metrics include one or more of the following: (1) reachability, (2) number of path changes, and (3) number of BGP updates, which are each further discussed below. From the point of view of a router (or route monitor), reachability generally refers to the fraction of time that the router can reach a certain destination prefix. Path changes generally refers to the number of times the attribute AS_PATH changed for a certain destination prefix. Updates generally refers to the plain count of BGP update messages received during a given round (e.g., a predetermined time interval/window of 15 minutes or some other predefined period of time).

In an example implementation, the BGP metrics (e.g., also referred to as routing metrics) are monitored per prefix, and computed based on the MRT files. For example, BGP metrics can be computed periodically or based upon events (e.g., based upon updates to the MRT data feeds from public and/or private monitors or upon request/demand for updated report(s) including BGP metrics and/or monitored routing information).

In this example, BGP metrics (e.g., also referred to as routing metrics) per monitor can include one or more of the following: (1) path changes, (2) reachability, and (3) number of updates (e.g., also referred to as updates), which are each further discussed below.

In one embodiment, path changes is an example routing metric that can provide a total number of BGP path changes over the timespan of a given round (e.g., a route withdrawal can be counted as a path change; in this case, BGP updates that change attributes other than ASPATH are not captured by this metric).

In one embodiment, reachability is an example routing metric that can provide a percentage of time there was a route to a given prefix in the BGP/routing table during a given round (e.g., a reachability value of 0% for this metric would indicate that the prefix was not reachable at all during the entire round).

In one embodiment, number of updates is an example routing metric that can provide a total number of BGP updates observed from a given (public/private) route monitor to a given prefix during a given round.

Figure 4:
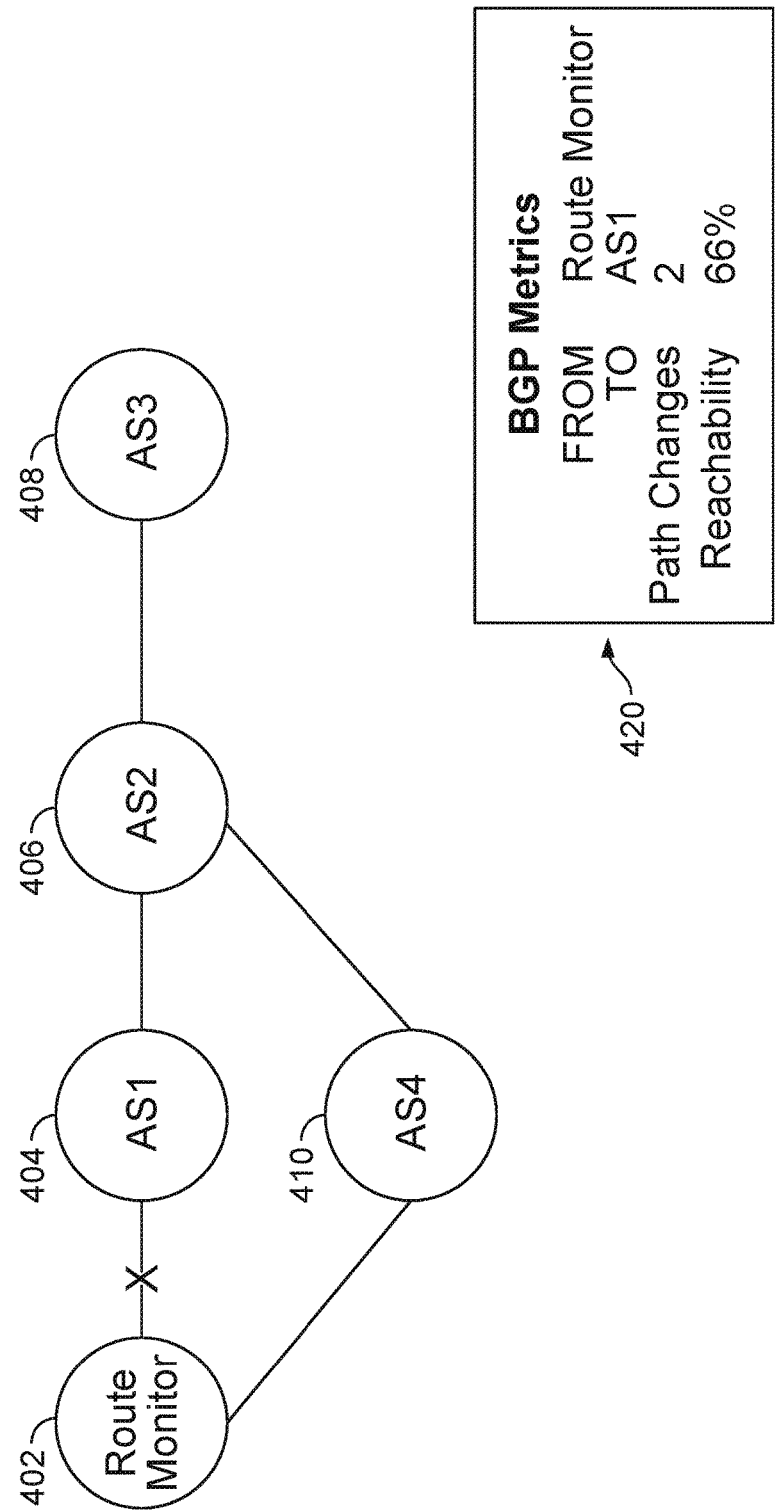
FIG. 4 is a network diagram that illustrates an example scenario if a route between a route monitor and a given Autonomous System (AS) is unavailable.

FIG. 4 is a network diagram that illustrates an example scenario if a route between a route monitor and a given Autonomous System (AS) is unavailable. As shown, FIG. 4 illustrates an example scenario if a route between a route monitor 402 (e.g., a public route monitor or a private route monitor) is unavailable between the route monitor and AS1 404. As a result, route monitor 402 would switch to the alternative route through AS4 410, which allows route monitor 402 to be able to reach the destination via AS2 406 and AS3 408.

In this example, the route path change as shown in FIG. 4 would count as one path change during this example round/time window (e.g., BGP data can be aggregated for a 15-minute window of time or another time period can be used for each round, such as similarly described above). If another route change occurs during this example round/time window, such as when the previously unavailable route from route monitor 402 to AS1 404 returns (e.g., assuming that the route becomes available again during this example round/time window), then that would count as a second path change during this example round/time window. Assuming unavailability for 5 minutes during that 15-minute period, then the reachability metric to AS1 404 from route monitor 402 would be calculated to be equal to 66% (e.g., only 10 minutes out of the 15-minute time period could the destination be reached during this example round/time window, assuming the round/time window is a 15-minute time window). The BGP metrics for this example scenario from route monitor 402 to AS1 404 are shown in 420: two path changes and calculated reachability equal to 66% for this example round.

Figure 5:
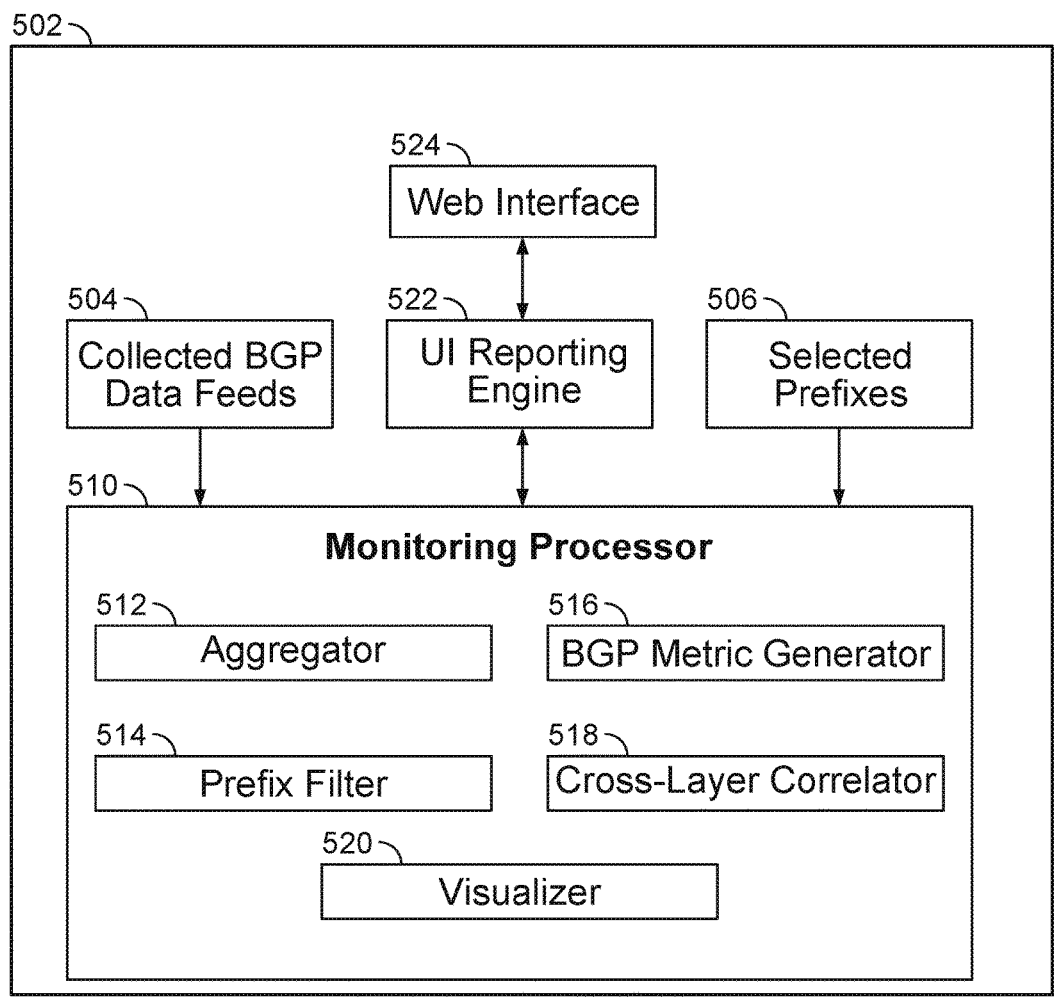
FIG. 5 is a component diagram illustrating a system for monitoring service availability using distributed BGP routing feeds in accordance with some embodiments.

System for Monitoring and Troubleshooting Service Availability Using Distributed BGP Routing Feeds FIG. 5 is a component diagram illustrating a system for monitoring service availability using distributed BGP routing feeds in accordance with some embodiments. As shown, a system 502 includes components for implementing a monitoring service availability using distributed BGP routing feeds in accordance with some embodiments. In one embodiment, system 502 is implemented in a web tier (e.g., web tier 104 as shown in FIG. 1) of a platform for monitoring service availability using distributed BGP routing feeds (e.g., platform 100 as shown in FIG. 1).

Referring to FIG. 5, system 502 includes a monitoring processor 510 that receives collected BGP data feeds 504 and selected prefixes 506. In one embodiment, collected BGP data feeds are received via a storage tier from a route monitor collector that is in communication with distributed (public/private) route monitors (e.g., via storage tier 112 from route monitor collector 114 that is in communication with distributed (public/private) route monitors 120, 122, and 124). In one embodiment, selected prefixes are received using automated and/or user selection input techniques as similarly described above to select prefixes of interest for BGP metric processing, reporting, and visualization, such as also further described below.

As shown, monitoring processor 510 includes an aggregator 512 for aggregating the collected BGP data feeds 504. For example, the distributed BGP data feed can be aggregated per round/time window into bins, such as similarly described above.

Monitoring processor 510 also includes a prefix filter 514 for filtering the collected and aggregated BGP data based on selected prefixes 506. For example, selected prefixes can filter the BGP data to focus on the prefixes of interest for BGP metric processing, reporting, and visualization, such as also further described below.

Monitoring processor 510 also includes a BGP metric generator 516 to generate one or more BGP metrics based on the collected and aggregated BGP data for the prefixes of interest (e.g., selected prefixes 506). As an example, the BGP metric generator can provide the following example BGP metrics: path changes, reachability, updates, and/or other BGP/routing metrics, such as similarly described above (e.g., BGP metrics can be calculated on aggregated BGP data to provide BGP metrics per bin/round/time window).

Monitoring processor 510 also includes a cross-layer correlator 518 for performing cross-layer correlation of BGP/routing data with various other network layer data, such as similarly described herein. For example, the cross-layer correlator can perform a (space/time) correlation with a path trace and BGP routing layer. As another example, the cross-layer correlator can provide a mapping between a host name, IP address, and BGP prefix.

Monitoring processor 510 also includes a visualizer 520 for generating visualizations of BGP/routing data and/or BGP metrics. For example, the visualizer can generate various graphs of BGP/routing data and/or BGP metrics, such as disclosed herein.

As also shown, monitoring processor 510 is in communication with a user interface (UI) reporting engine 522. For example, the UI reporting engine can facilitate the generation of various reports based on BGP data analysis and BGP metrics, cross-layer correlation, and/or visualization provided by monitoring processor 510, such as disclosed herein. UI reporting engine 522 is also in communication with a web interface 524 that facilitates web-based communications with system 502. For example, a user (e.g., a subscribing/authorized user) of the monitoring service availability using distributed BGP routing feeds can request, retrieve, and/or view such reports via a web browser executed on a client computing device (e.g., smart phone, tablet, laptop, computer, etc.) that is in communication with system 502 via web interface 524.

In one embodiment, monitoring processor 510 and the other components of system 502 are implemented in software (e.g., using a high-level programming language). In an example implementation, system 502 can be implemented in software, such as using the C++ programming language to implement a back-end processing component(s) of the system (e.g., monitor processor 510), using the Java programming language to implement a web-tier component(s) of the system (e.g., web interface 524), and the visualization component(s) (e.g., UI reporting engine 422) can be implemented using the D3 JavaScript library available at http://d3js.org/, and/or other programming/scripting languages and/or library components/packages can be used to implement components of the system. In one embodiment, monitoring processor 510 is implemented in software executed on a computer processor using a memory for storing instructions and data for processing using the techniques disclosed herein. In an example implementation, system 502 (e.g., in this example implementation, including web tier 104, storage tier 112, route monitor collector 114, and controller 116) can be executed on a server or a plurality of servers, such as using Amazon Web Services® (AWS) or another commercially available cloud computing service.

Whenever system 502 is described as performing a task, a single component, a subset of components, or all components of system 502 may cooperate to perform the task. Similarly, whenever a component of system 502 is described as performing a task, a subcomponent may perform the task and/or the component may perform the task in conjunction with other components. In various embodiments, portions of system 502 are provided by one or more third parties. Depending on factors such as the amount of computing resources available to system 502, various logical components and/or features of system 502 may be omitted and the techniques described herein adapted accordingly. Similarly, additional logical components/features can be added to system 502 as applicable.

Route Visualization

Figure 6:
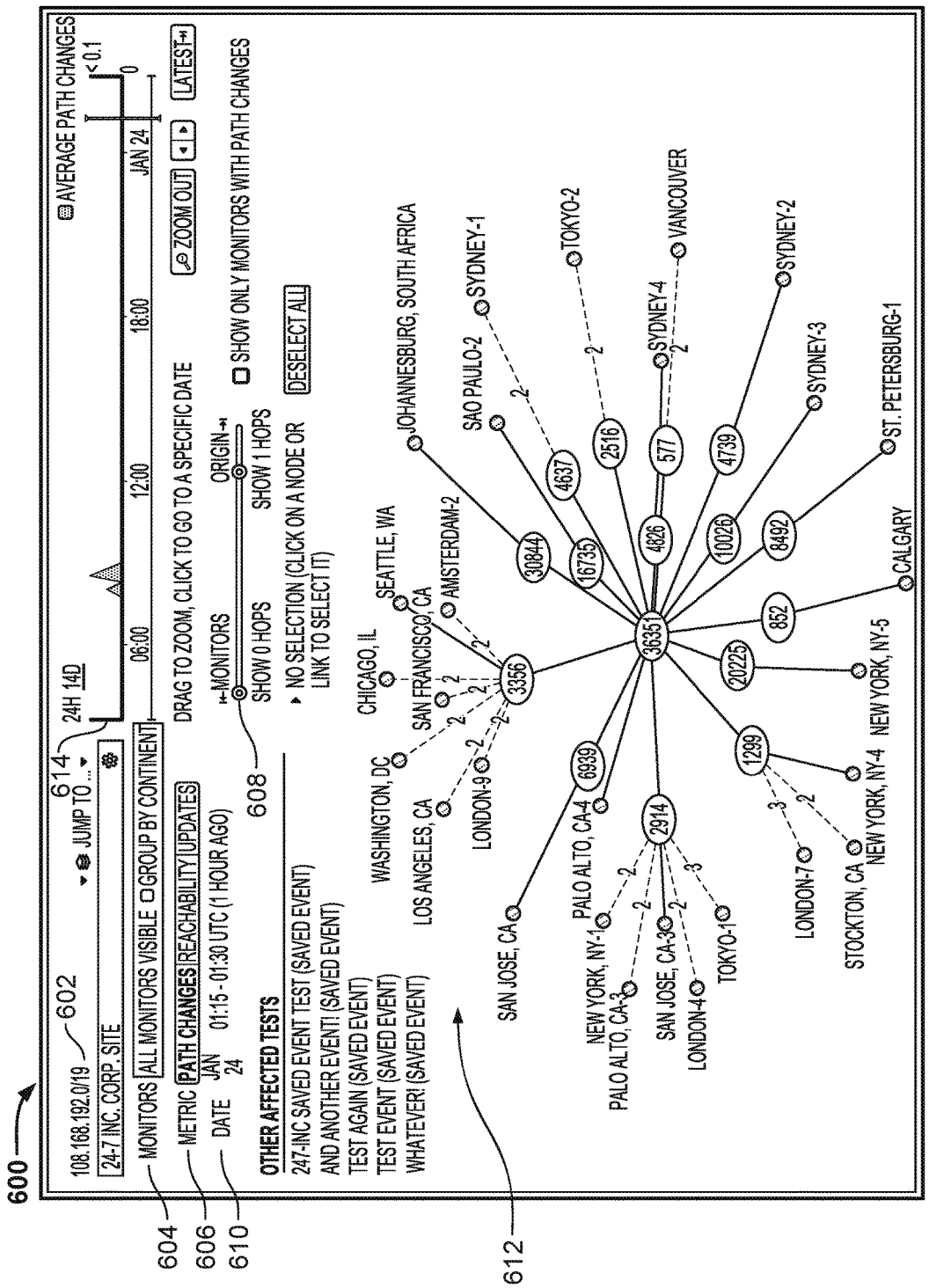
FIG. 6 is a screen shot diagram illustrating route visualization for monitoring service availability using distributed BGP routing feeds in accordance with some embodiments.

FIG. 6 is a screen shot diagram illustrating route visualization for monitoring service availability using distributed BGP routing feeds in accordance with some embodiments. In one embodiment, the route visualization shown in screen shot 600 can be generated using platform 100 as shown in FIG. 1 and/or system 502 as shown in FIG. 5.

Referring to FIG. 6, screen shot 600 is an example route visualization generated using BGP data collection using various techniques disclosed herein. In this example, the route visualization shows the Autonomous Systems (AS) path between the origin of the prefix and distributed route monitors (e.g., public and/or private route monitors). Route changes are also indicated as dashed lines as shown in FIG. 6 and as further described below.

As shown, the route visualization includes several features for providing different views and metrics of the route visualization. A prefix filter at 602 allows a user to specify the BGP prefix(es) of interest for display in the route visualization. A monitor filter shown at 604 allows a user to select the monitors of interest for display in the route visualization. A metric selector shown at 606 allows a user to specify the BGP/route metric (e.g., path changes, reachability, or updates) to load in the timeline of the route visualization; it also affects the status (e.g., color or other visual status indicator(s) can be provided) of the monitors (e.g., red monitors can indicate 0% reachability and green monitors can indicate 100% reachability). A scope selector shown at 608 determines how many AS hops to show after the origin or after the monitors in the route visualization. A time selector shown at 610 allows a user to select the round(s) of time to display in the route visualization.

The AS connectivity topology is also illustrated in the visualization at 612. In this example, the topology graph includes the following elements: (1) an origin in the center of the topology graph, which is the AS that originates the route; (2) intermediate AS, which are shown as gray nodes that provide transit between the monitor and the origin; and (3) monitors, which are indicated with the relatively smaller circles attached at the borders of the paths (e.g., and private monitors (if any) can be indicated with double circles).

In one embodiment, a topology graph is a force-directed layout used to represent the origin of the routes in the center and the connected Autonomous Systems (e.g., each node is an AS) laid out in a radial way as shown in graph 612. Routers are shown as the leaf nodes of graph 612 and are visually indicated according to the selected metric (e.g., visual indicators, such as colors and/or other visual indicators of such icons, can be used to indicate a selected metric). For example, the yellow/orange nodes (e.g., or some other visual indicator(s)) can correspond to monitors that had path changes, while the green nodes (e.g., or some other visual indicator(s)) can correspond to monitors that did not have any path changes.

As also shown in FIG. 6, timeline 614 shows aggregations of 15 minutes (e.g., other time intervals/increments can be used or configured to be used), which are referred to as rounds. Data is visualized per round, and in each round, the paths are shown, using a dashed style, and the final paths of the rounds are shown in solid style. In an example implementation, red dashed links (e.g., or some other visual indicator(s)) in graph 612 correspond to paths that were used at some point during the round, but were not in use at the end of the round, which, for example, can be useful to detect path exploration in BGP.

Correlation Between Routing and Application Traffic

In one embodiment, network layer/application monitoring can be performed based on user configuration of a network or application test. For example, if a user configures a periodic test to a given web site, such as www.example.com, the monitoring agents (e.g., agents 130, 132, and/or 134 as shown in FIG. 1) can map the domain to IP addresses, and from IP addresses to BGP prefixes (e.g., based on a longest prefix match, in which a longest BGP prefix match can be selected to an IP address of interest). These prefixes can start to be monitored automatically using route monitors (e.g., route monitors 120, 122, and/or 124 as shown in FIG. 1). For example, such testing/monitoring can be performed using the disclosed platform (e.g., platform 100 as shown in FIG. 1) to generate application traffic (e.g., controller 116 as shown in FIG. 1 can configure the agents to generate application traffic to the web site/domain of interest, in this example, www.example.com). At the same time, the disclosed platform can monitor the routing plane (BGP layer), so that if there is a routing event creating packet loss, the disclosed platform will first detect the packet loss at the application layer and facilitate a drill down to the routing layer to verify whether the root cause is at the routing layer or another application/network layer problem.

The various example use cases described below illustrate this and other examples for applying the disclosed platform and techniques to solve common network-related problems that can arise with web sites/services and/or distributed applications as will now be described in more detail.

Example Use Case Scenarios

Troubleshooting Service Disruption: Route Flapping Example

Route flapping generally occurs when routes alternate or are advertised and then withdrawn in rapid sequence, often resulting from equipment or configuration errors. Flapping often causes packet loss and results in performance degradation for traffic traversing the affected networks. Route flaps are visible as repeating spikes in route changes on the timeline of the disclosed graphical visualization techniques provided by a platform for monitoring service availability using distributed BGP routing feeds, such as further described below.

Figure 7:
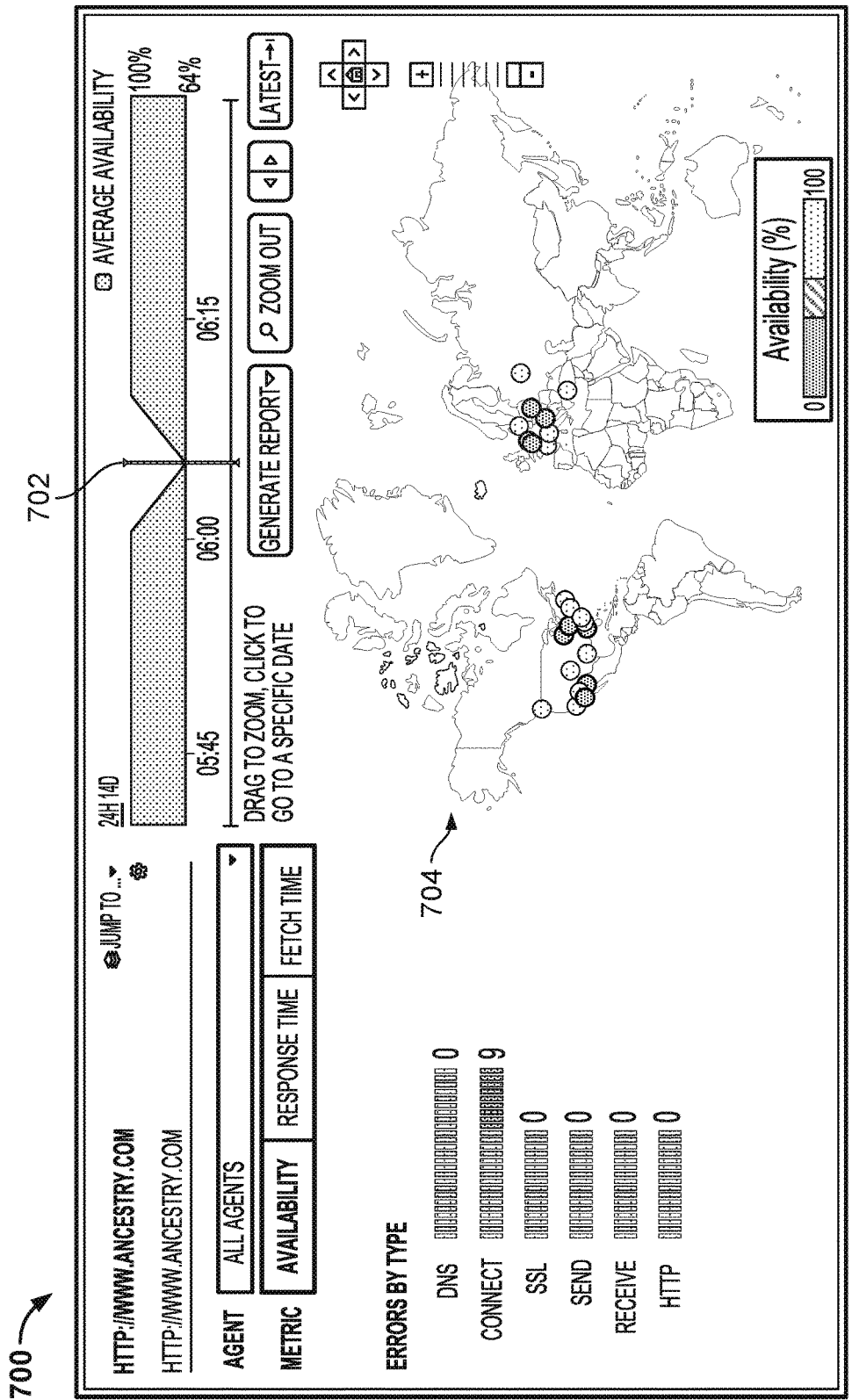
FIG. 7 is a screen shot diagram illustrating a visualization of an application view of a service disruption generated by a platform for monitoring service availability using distributed BGP routing feeds in accordance with some embodiments.

FIG. 7 is a screen shot diagram illustrating a visualization of an application view of a service disruption generated by a platform for monitoring service availability using distributed BGP routing feeds in accordance with some embodiments. In one embodiment, the visualization shown in screen shot 700 can be generated using platform 100 as shown in FIG. 1 and/or system 502 as shown in FIG. 5.

For example, this first use case scenario illustrates cross-layer troubleshooting techniques performed using the disclosed platform for monitoring service availability using distributed BGP routing feeds, by correlating monitored/generated network performance data for a given time window/period across two or more different layers of the network for monitors connecting to a destination of interest (e.g., in this example, a web site, www.ancestry.com).

As shown, in this case, the service disruption (e.g., service availability problem) with the destination of interest (e.g., in this example, a web site, http://www.ancestry.com) is shown to have been caused by a routing event. Referring to FIG. 7, the routing event is indicated at 702 revealing that the monitored availability to the destination of interest (e.g., web site, http://www.ancestry.com) dropped to approximately 0% at a particular time. In the application view as shown at 704, a drop in availability from a variety of locations around the world is indicated, which reveals exactly where availability issues have occurred (e.g., geographical locations of monitors that experienced such availability problems to the web site, http://www.ancestry.com).

Next, a path visualization view (e.g., also referred to as a path trace view) can be used to understand where the loss is occurring.

Figure 8:
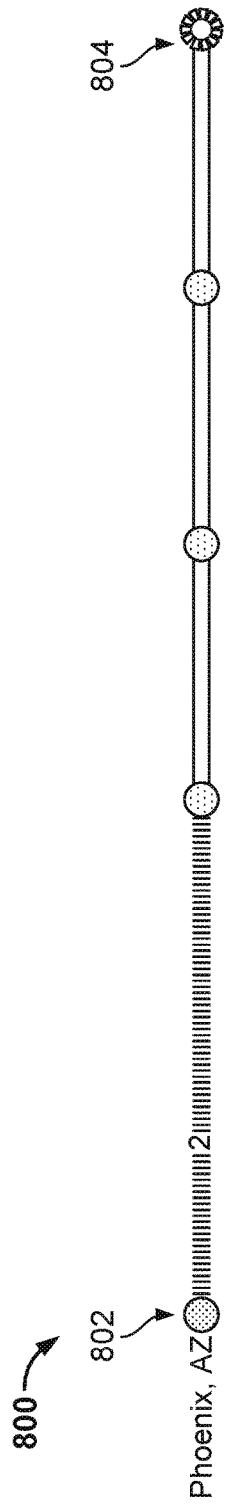
FIG. 8 is a screen shot diagram illustrating a visualization of a path view of a service disruption generated by a platform for monitoring service availability using distributed BGP routing feeds in accordance with some embodiments.

FIG. 8 is a screen shot diagram illustrating a visualization of a path view of a service disruption generated by a platform for monitoring service availability using distributed BGP routing feeds in accordance with some embodiments. In one embodiment, the visualization shown in screen shot 800 can be generated using platform 100 as shown in FIG. 1 and/or system 502 as shown in FIG. 5.

Referring to FIG. 8, a path view 800 shows the routes from a network monitoring agent (e.g., a monitoring service provider's agent) in Phoenix at 802, to the node where the path ends at 804. In this example path visualization view, interfaces with significant loss can be indicated with a distinct visual indicator (e.g., indicated with a dashed/colored circle, such as indicated at 804 as shown in FIG. 8). In one embodiment, when an interface is selected, the interface is displayed as a dashed line and the information that the agent probes gathered is displayed, as shown in FIG. 9 as further described below.

Figure 9:
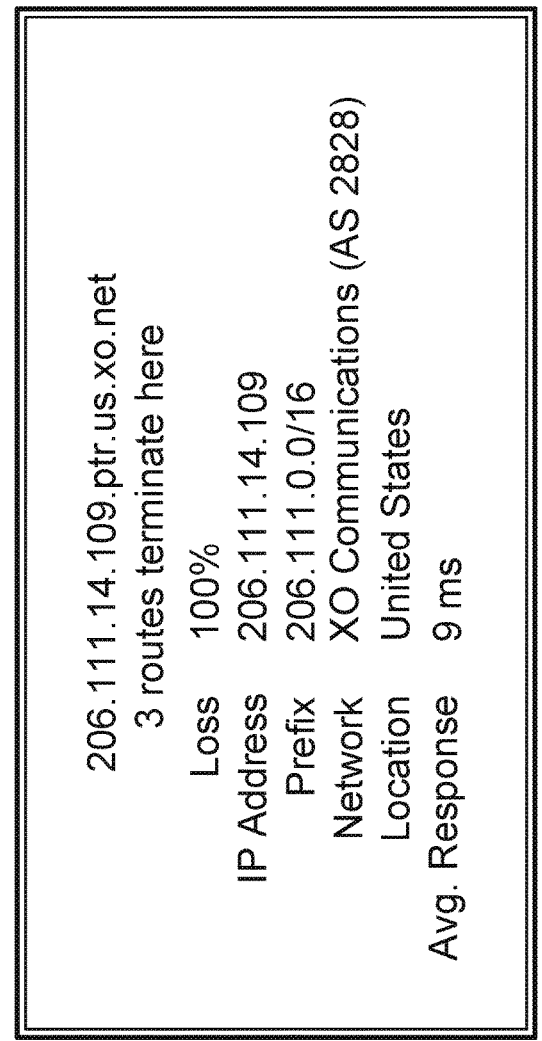
FIG. 9 is a screen shot diagram illustrating a visualization of information probed by a selected agent for determining a cause of a service disruption generated by a platform for monitoring service availability using distributed BGP routing feeds in accordance with some embodiments.

FIG. 9 is a screen shot diagram illustrating a visualization of information probed by a selected agent for determining a cause of a service disruption generated by a platform for monitoring service availability using distributed BGP routing feeds in accordance with some embodiments. In one embodiment, the visualization shown in screen shot 900 can be generated using platform 100 as shown in FIG. 1 and/or system 502 as shown in FIG. 5.

In this example, the probes from the Phoenix agent all terminated in this single location resulting in 100% packet loss inside of the XO Communications network as shown in FIG. 9. During the test, multiple agents were probing this site, which facilitates an examination of this event in greater detail, which reveals an emergence of an interesting pattern as discussed below.

Figure 10:
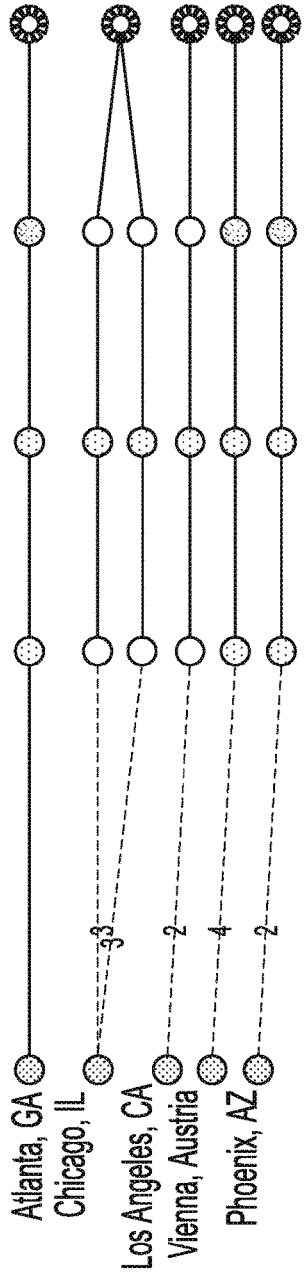
FIG. 10 is a screen shot diagram illustrating a visualization of test results for a set of agents for determining a cause of a service disruption generated by a platform for monitoring service availability using distributed BGP routing feeds in accordance with some embodiments.

FIG. 10 is a screen shot diagram illustrating a visualization of test results for a set of agents for determining a cause of a service disruption generated by a platform for monitoring service availability using distributed BGP routing feeds in accordance with some embodiments. In one embodiment, the visualization shown in screen shot 1000 can be generated using platform 100 as shown in FIG. 1 and/or system 502 as shown in FIG. 5.

In the above-described test during this use case scenario, five distinct agent locations were each exhibiting similar behavior, 100% packet loss inside of a single network, XO Communications, as shown in test results shown in screen shot 1000 of FIG. 10.

Figure 11:
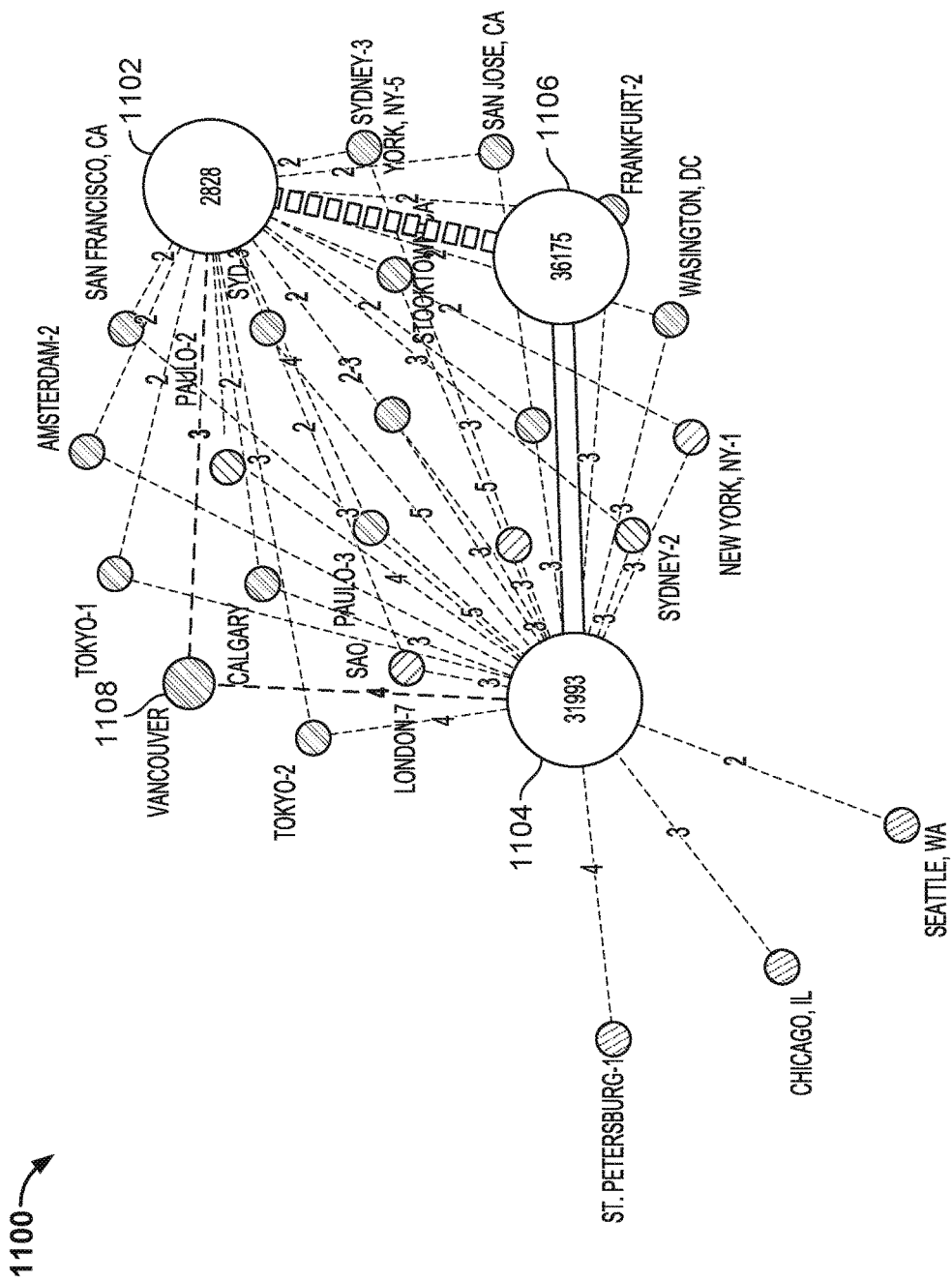
FIG. 11 is a screen shot diagram illustrating a visualization of BGP routes for determining a cause of a service disruption generated by a platform for monitoring service availability using distributed BGP routing feeds in accordance with some embodiments.

FIG. 11 is a screen shot diagram illustrating a visualization of BGP routes for determining a cause of a service disruption generated by a platform for monitoring service availability using distributed BGP routing feeds in accordance with some embodiments. In one embodiment, the visualization shown in screen shot 1100 can be generated using platform 100 as shown in FIG. 1 and/or system 502 as shown in FIG. 5.

Why are all these interfaces inside of the XO Communications network dropping packets? To determine the answer to this question, a BGP route visualization is generated as shown in screen shot 1100 of FIG. 11.

Before discussing what happened in this example use case scenario, FIG. 11 is generally described. As discussed above, each BGP Autonomous System (AS) is assigned its own unique Autonomous System Number (ASN) for routing on the Internet. In this example, three ASNs are displayed in this view as shown in FIG. 11, shown as AS 2828 at 1102, which is registered to XO Communications, AS 31993 at 1104, which is registered to American Fiber Systems, Inc., and AS 36175 at 1106, which is registered to myfamily.com, Inc. In an example implementation of the BGP route visualization, hovering by a user (e.g., using a mouse, finger, and/or other user interface techniques) over an individual ASN can cause additional information about each AS to be output to the user.

In this example BGP route visualization, destination networks are shown using a visual indicator in this view (e.g., a color visual indicator, such as in green in this view), which in this case is myfamily.com (ancestry.com), the web site that is being monitored in this example use case scenario. Intermediary ASNs in the path from the origin to the monitor are shown in grey shaded circles, with the network's autonomous system (AS) number shown inside the circle. In this case, the transit networks are AS 31993 American Fiber Systems as shown at 1104, and AS 2828 XO Communications as shown at 1102. The relatively smaller circles with location names represent BGP monitors. The label "3" in the path between Vancouver at 1108 and AS 2828 at 1102 indicates there are three AS hops between that monitor and the AS 2828 network. Dotted/colored lines can be used as visual indicators to represent links that were used as the best path at some point during the round/bin (e.g., 15-minute time window) the topology refers to, but are no longer used at the end of the round/bin. In this case, the link to the upstream XO (AS2828) stopped being used in favor of AS31993.

Based on the visualization of FIG. 11, it is now apparent why the network monitoring is indicating a 100% packet loss inside of the XO Communications network. A BGP route change occurred, and as a result, there were no longer routes available via the XO Communications network. However, packets were still being forwarded to the XO Communications network due to a BGP convergence delay. When this occurred, traffic in route to the myfamily.com AS would not have been able to reach its destination.

As such, absent the disclosed BGP layer analysis for this example use case scenario (e.g., including the visualization/reporting as discussed above), the troubleshooting of network service disruption, such as the availability of the web site of interest (e.g., delay and/or packet losses), would not have been determined to be associated with the BGP layer (e.g., identified that path changes, packet losses, and/or reachability problems were identified at the BGP layer during the relevant time window/period).

Another common scenario where BGP comes into play is when a network operator changes peering with ISPs. Peering can change for a variety of reasons, including commercial peering relationships, equipment failures, and/or maintenance. During and after a peering change, the disclosed platform for monitoring service availability using distributed BGP routing feeds can facilitate verifying reachability to the ISP/service from networks around the world. For example, the disclosed platform presents reachability and route change views, as well as proactive alerts to help troubleshoot issues that may occur, such as similarly described herein.

Another example use case scenario for validating multi-homing (and route distribution in general) will now be discussed below.

Validating Multi-Homing and BGP Route Distribution in General

In some cases, an entity can obtain Internet access from two or more Internet Service Providers (ISPs) (e.g., AT&T and Verizon or other ISPs), such as to provide more reliable Internet access for a distributed application, such as a web site/service, and/or for (external) Internet access to the entity's data center(s). For instance, in such a multi-homing scenario, the web site/service can still be accessible via a second ISP even when a first ISP is experiencing delays/downtime.

Figure 12:
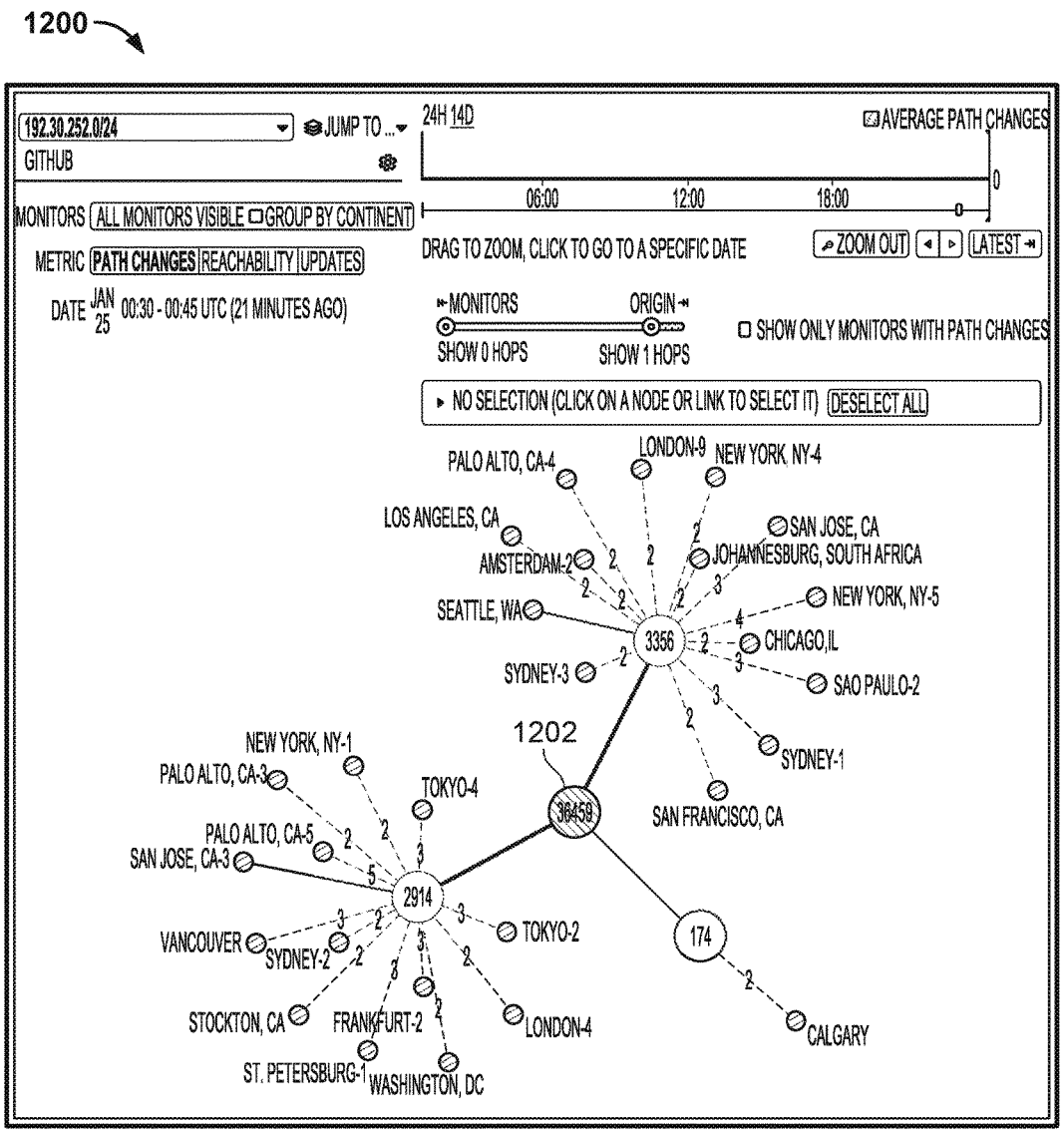
FIG. 12 is a screen shot diagram illustrating a visualization of route distribution in a multi-homing use case scenario generated by a platform for monitoring service availability using distributed BGP routing feeds in accordance with some embodiments.

FIG. 12 is a screen shot diagram illustrating a visualization of route distribution in a multi-homing use case scenario generated by a platform for monitoring service availability using distributed BGP routing feeds in accordance with some embodiments. In one embodiment, the visualization shown in screen shot 1200 can be generated using platform 100 as shown in FIG. 1 and/or system 502 as shown in FIG. 5.

Referring to FIG. 12, another use case for BGP route visualization is to validate traffic engineering policies and route distribution. For example, FIG. 12 shows how traffic to AS36459 prefix 192.30.252.0/24 (Github.com) as shown at 1202 is routed across different ISPs. As shown in FIG. 12, most traffic is balanced between provider AS2914 (NTT) and AS3356 (Level3), and there is a single router in Canada (Calgary) that is reaching GitHub through AS174 (Cogent). In this use case scenario, only public monitors were used for inbound BGP data collection and such BGP route visualization is shown in FIG. 12.

For example, this example use case scenario can facilitate network capacity/management planning for a distributed application, such as a web site/service. An IT/network administrator/manager can use such a visualization of route distribution in a multi-homing use case scenario as shown in FIG. 12 to manage and verify access to the distributed application and to balance traffic between different ISP/network service providers (e.g., to verify a desired distribution of routes that can facilitate up-time in case one or more ISPs experience delays/downtime).

Internal BGP Visibility: Inside-Out View of BGP Routes

In one embodiment, a platform for monitoring service availability using distributed BGP routing feeds includes private route monitors, such as similarly described above. For example, the capability of collecting BGP feeds from private route monitors allows a customer/subscriber of such a monitoring service to setup a multi-hop eBGP session between one of their BGP speakers (e.g., an internal router that announces BGP routes) and a route collector of the monitoring service (e.g., in this case, using a combination of BGP data collected from public monitors and private monitors). For example, there are at least two benefits from using this approach as will now be described.

Figure 13:
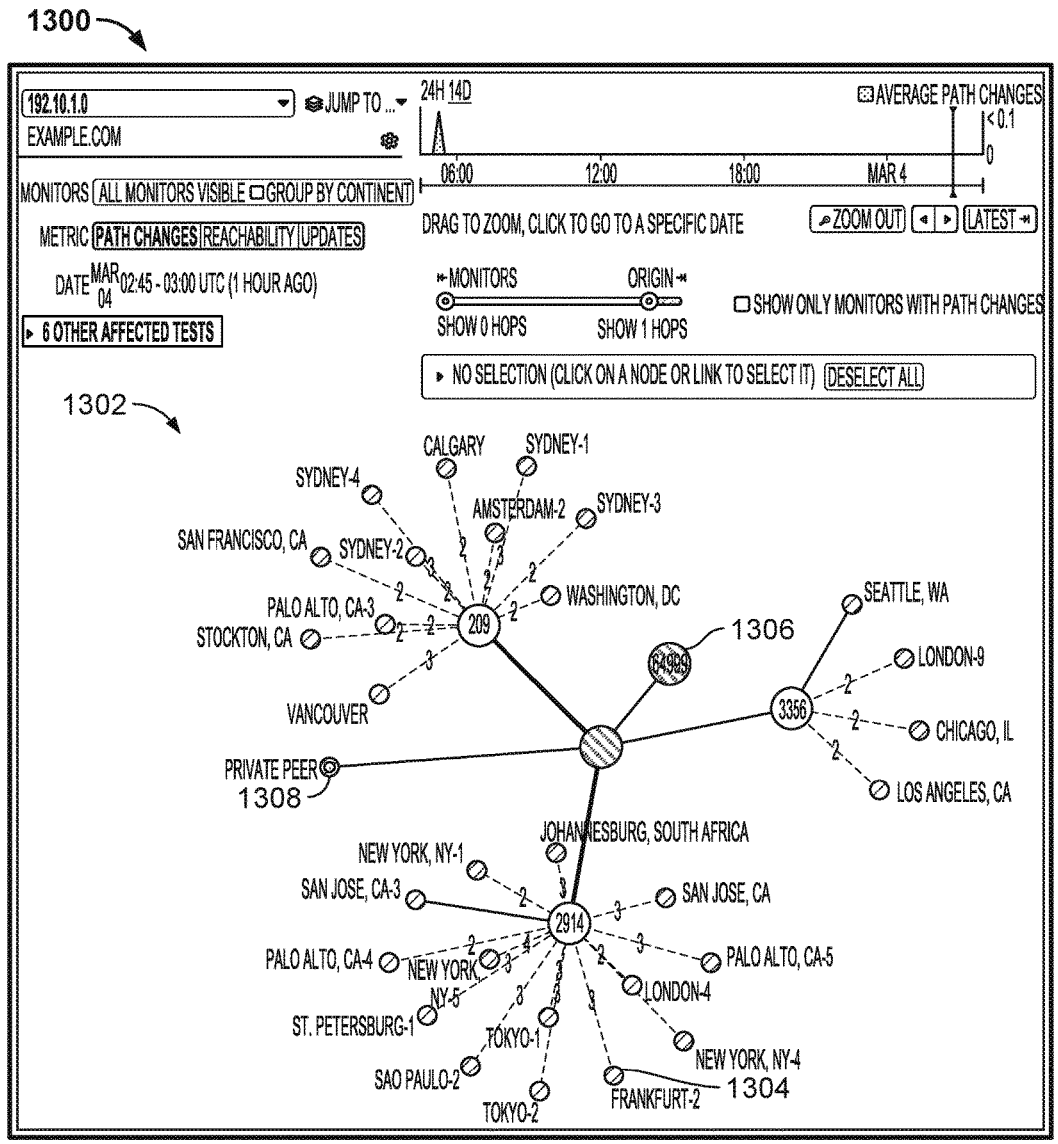
FIG. 13 is a screen shot diagram illustrating a visualization of internal BGP routes visibility generated by a platform for monitoring service availability using distributed BGP routing feeds in accordance with some embodiments.

First, this approach facilitates an inside-out view of BGP routes that can identify BGP routing problems that originate inside a customer's/subscriber's network (e.g., as opposed to external BGP routing issues/problems that originate inside a customer's/subscriber's network). Internal prefixes generally refer to prefixes originated inside a given (enterprise) network. For example, the private BGP data feed collected using private route monitors can be useful to triage problems whose root cause is inside the customer's/subscriber's network versus problems that originate outside of the customer's/subscriber's network. As shown in FIG. 13 and further discussed below, a single view of public and private feeds can be provided that facilitates such troubleshooting and identification of such internal BGP routing problems.

Second, this approach facilitates a view of BGP routes that can identify sub-optimal BGP routing. Internal prefixes generally refers to prefixes belonging to a third party (e.g., a SaaS provider or another third party entity), the private BGP data feed collected using private route monitors can be useful to detect cases where a route to a destination is sub-optimal (e.g., which can affect performance of the distributed application, such as a web site/service or other distributed application).

FIG. 13 is a screen shot diagram illustrating a visualization of internal BGP routes visibility generated by a platform for monitoring service availability using distributed BGP routing feeds in accordance with some embodiments. In one embodiment, the visualization shown in screen shot 1300 can be generated using platform 100 as shown in FIG. 1 and/or system 502 as shown in FIG. 5.

In particular, FIG. 13 shows an example of a customer's internal prefixes as seen by a combination of public and private monitors. For example, private monitors can be indicated in the topology graph shown at 1302 via distinct visual indicators (e.g., using a relatively smaller (and green) double circle to indicate a private BGP monitor in the topology graph, such as shown at 1304 in FIG. 13). As shown, there are two origin Autonomous Systems (AS) in this view of the topology graph that are also shown via distinct visual indicators (e.g., shown using relatively larger (and green) circles in the visualization of the topology graph, such as shown at 1306 in FIG. 13). However, as also shown in FIG. 13, private AS64999 as shown at 1306 in this case is only visible by the private route monitor shown at 1308, and it is not exposed to the other (public) monitors.

For example, the visualization of internal BGP routes as shown in FIG. 13 can help diagnose whether a routing change is a network problem that is internal (e.g., the customer's enterprise network) or external (e.g., the ISP's network). In an example use case, if during a given time window/period, if the internal monitor does not experience any reachability issues or path changes, then the BGP routing problem is most likely associated with an external network (e.g., the routing problem is associated with an ISP's network and not the customer's enterprise network). As such, a root cause of a routing change problem can then be shown to not be associated with an internal to the enterprise network routing change, but rather can be shown to be external to the enterprise network, which the disclosed technique(s) and visualization(s) can validate.

As another example, a SaaS provider can have private monitors inside a customer's enterprise network to similarly facilitate network service availability to the web site/service (e.g., gihub.com, salesforce.com, ancestry.com, and/or another web site/service and/or distributed application provided by the SaaS provider).

The disclosed techniques can similarly be used to determine whether the route is being detoured to a malicious destination, which is generally referred to as route hijacking, such as further described below in the next use case scenario.

Route Hijacking

Figure 14:
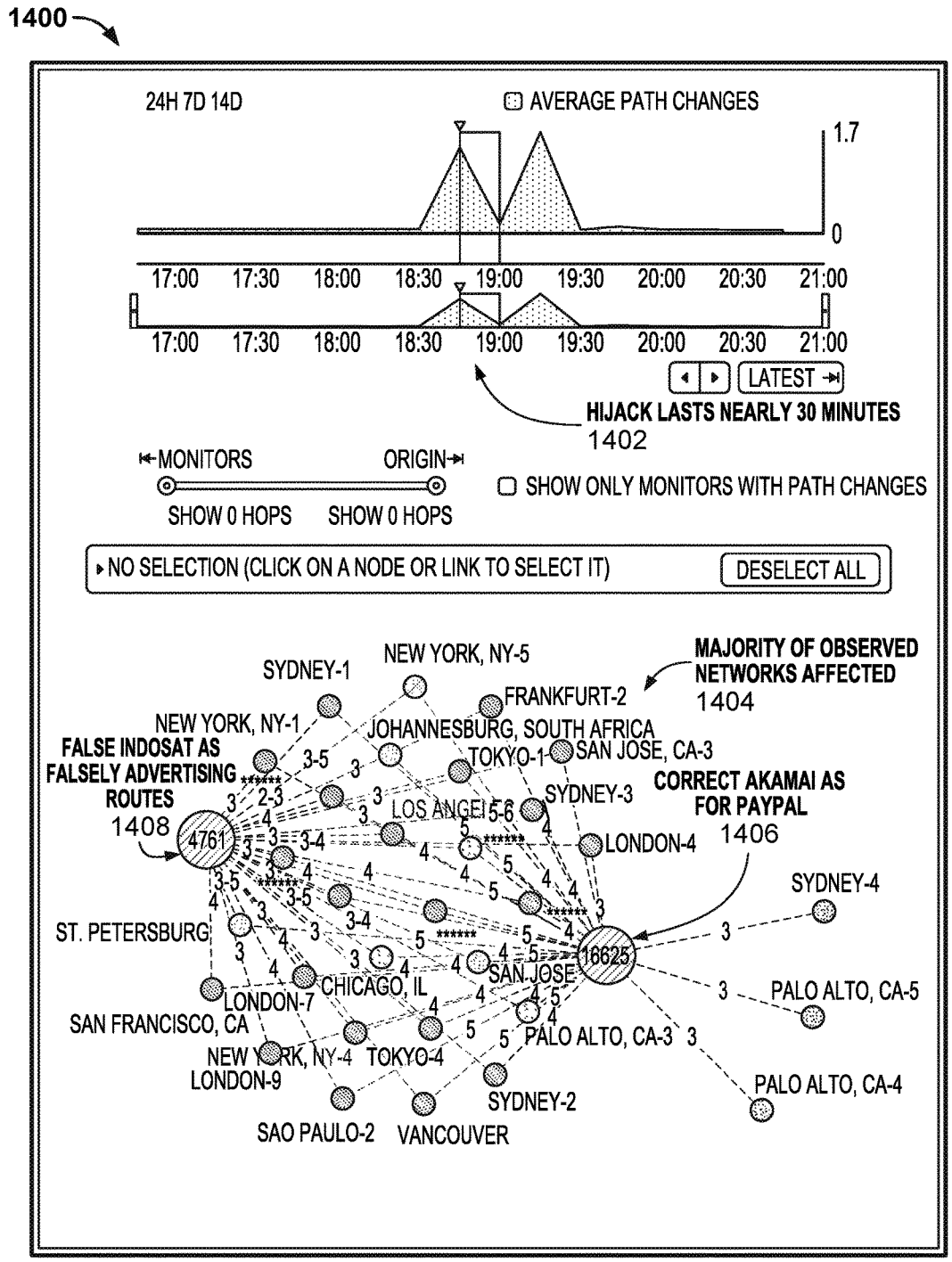
FIG. 14 is a screen shot diagram illustrating a visualization of routes that indicate route hijacking generated by a platform for monitoring service availability using distributed BGP routing feeds in accordance with some embodiments.

FIG. 14 is a screen shot diagram illustrating a visualization of routes that indicate route hijacking generated by a platform for monitoring service availability using distributed BGP routing feeds in accordance with some embodiments. In one embodiment, the visualization shown in screen shot 1400 can be generated using platform 100 as shown in FIG. 1 and/or system 502 as shown in FIG. 5.

Route hijacking (e.g., also sometimes referred to as a BGP prefix hijack and/or BGP hijack) typically occurs when a network advertises a prefix that belongs to some other network, either by mistake (e.g., as a result of a data entry error) or in order to maliciously deny service or inspect traffic. For example, BGP advertisements can be used to intentionally/maliciously inject bad routes to one or more legitimate AS in order to perform a Denial of Service (DoS) attack or to perform a man-in-the-middle attack to facilitate access to data in the detoured/hijacked traffic for inspection of the detoured traffic (e.g., for accessing information by an unintended recipient/unauthorized user including possibly confidential data). Because BGP advertisements are generally trusted among ISPs, errors or improper filtering by an ISP can be propagated quickly throughout routing tables around the Internet. As an ISP network operator, route hijacking is generally evident when your prefixes or more specifics are announced by another party. In some cases, the effects may be localized to only a few networks, but in more serious cases, hijacks can affect reachability from the entire Internet.

Referring to FIG. 14, an example route hijack is revealed with a test for PayPal, which is one of Akamai's customers. This example route hijack actually occurred in early April 2014, in which Indosat, a large Indonesian telecom, incorrectly advertised a majority of the global routing table, in effect claiming that their network was the destination for a large portion of the Internet. A popular Content Delivery Network (CDN) service provided by Akamai was particularly hard hit by this route hijack, as a substantial portion of its customers' traffic rerouted to the Indosat network for nearly 30 minutes as shown in the time line of average path changes at 1402 of FIG. 14 in which a majority of observed networks were affected as shown at 1404.

In particular, FIG. 14 shows the hijack in progress, with two origin AS, the correct one for Akamai (AS 16625) as shown at 1406 and the incorrect one for Indosat (AS 4761) as shown at 1408, which for approximately 30 minutes was the destination for 90% of the public BGP vantage points (e.g., public monitors). While this hijack was not believed to have been intentional, the effects were nonetheless serious as revealed by the visualizations shown in FIG. 14.

Distributed Denial of Service (DDoS) Mitigation

For companies using cloud-based DDoS mitigation providers, such as Prolexic and Verisign, BGP is a common way to shift traffic to these cloud-based DDoS mitigation providers during an attack. For example, monitoring BGP routes during a DDoS attack can be used to verify that traffic is being properly routed to the cloud-based DDoS mitigation provider's data center(s) (e.g., the cloud-based DDoS mitigation provider's data scrubbing centers). In the case of DDoS mitigation, the origin AS for a customer's prefixes should change from the customer's own AS to the AS of the cloud-based DDoS mitigation provider.

Figure 15:
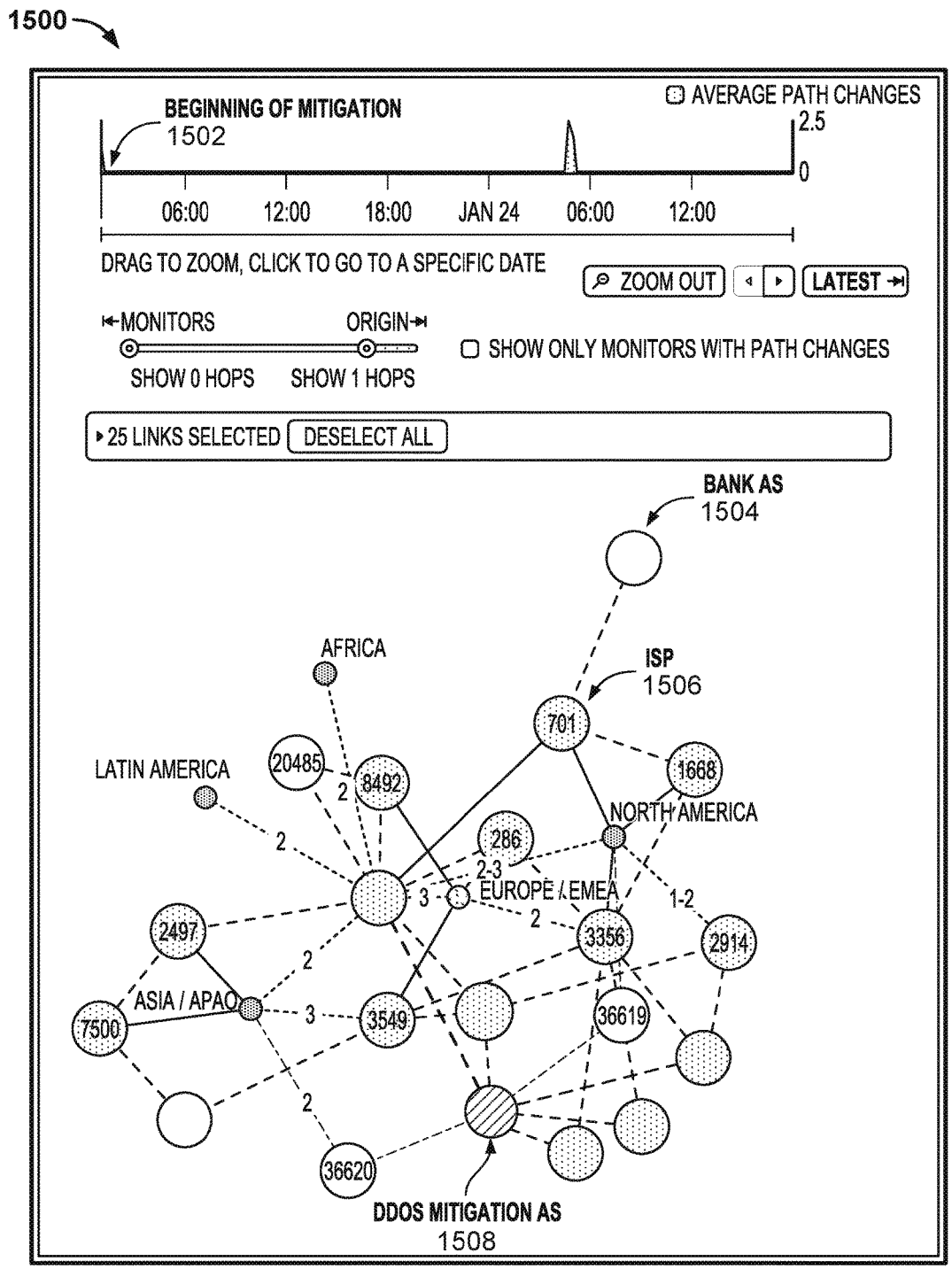
FIG. 15 is a screen shot diagram illustrating a visualization of routes that indicate Distributed Denial of Service (DDoS) mitigation generated by a platform for monitoring service availability using distributed BGP routing feeds in accordance with some embodiments.

FIG. 15 is a screen shot diagram illustrating a visualization of routes that indicate Distributed Denial of Service (DDoS) mitigation generated by a platform for monitoring service availability using distributed BGP routing feeds in accordance with some embodiments. In one embodiment, the visualization shown in screen shot 1500 can be generated using platform 100 as shown in FIG. 1 and/or system 502 as shown in FIG. 5.

Referring to FIG. 15, the beginning of a DDoS mitigation is observed at 1502. In particular, the origin AS at 1504 (e.g., the Bank AS in this example) is indicated as having changed in an actual example for a global bank customer that was the target of a DDoS attack. As also shown, the routes to the Bank AS are withdrawn, and new routes to the cloud-based DDoS mitigation vendor at 1508 (e.g., ISP 1506 in this example) are advertised. The process then happens in reverse at the end of the attack when DDoS mitigation is turned off (e.g., is no longer required).

Figure 16:
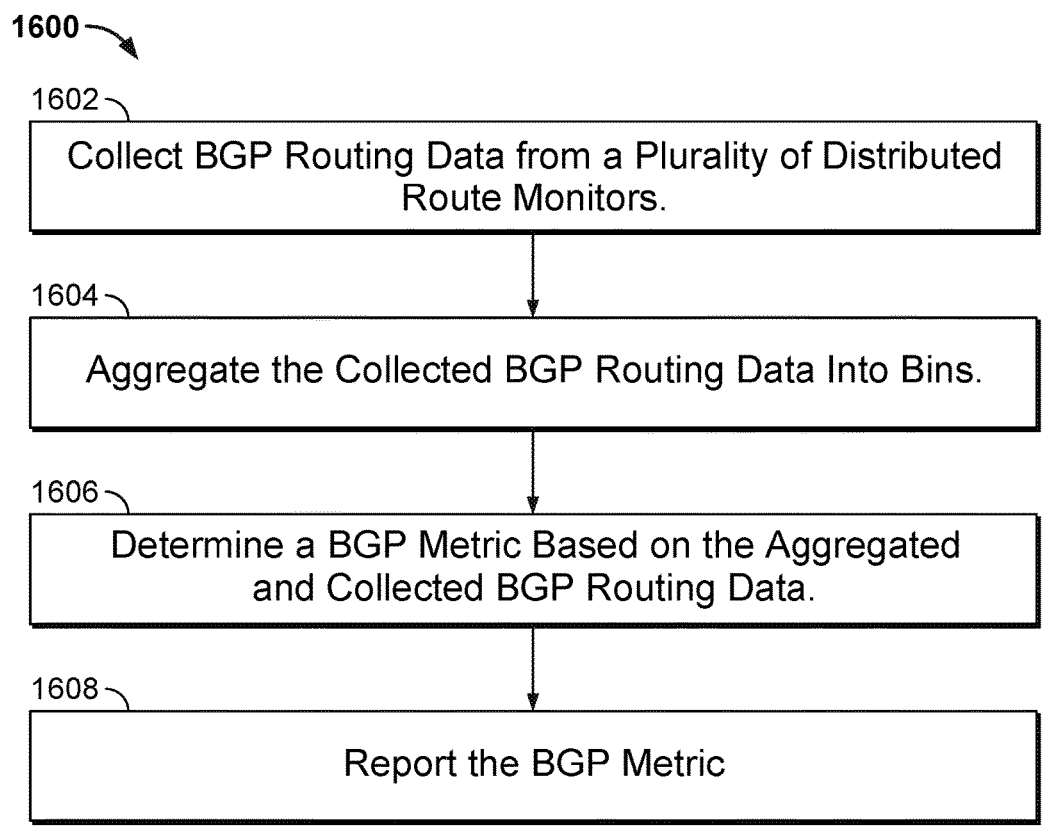
FIG. 16 is a flow diagram illustrating a process for monitoring service availability using distributed BGP routing feeds in accordance with some embodiments.

Example Processes for Monitoring Service Availability Using Distributed BGP Routing Feeds FIG. 16 is a flow diagram illustrating a process for monitoring service availability using distributed BGP routing feeds in accordance with some embodiments. In one embodiment, a process 1600 can be performed using platform 100 as shown in FIG. 1 and/or system 502 as shown in FIG. 5.

At 1602, collecting BGP routing data from a plurality of distributed route monitors is performed. For example, the plurality of distributed route monitors can include public route monitors and private route monitors, as similarly described above.

At 1604, aggregating the collected BGP routing data into bins is performed. For example, the collected BGP routing data can be aggregated into bins/rounds of a predetermined period of time (e.g., 15-minutes or another predetermined period of time), as similarly described above.

At 1606, determining a BGP metric based on the aggregated and collected BGP routing data is performed. Example BGP metrics include a reachability metric, a number of path changes metric, or a number of BGP updates metric, as similarly described above.

At 1608, reporting the BGP metric based on the aggregated and collected BGP routing data is performed. For example, the report can include a graphical visualization of a plurality of routes based on the aggregated and collected BGP routing data and/or various other visualizations, as similarly described above.

Figure 17:
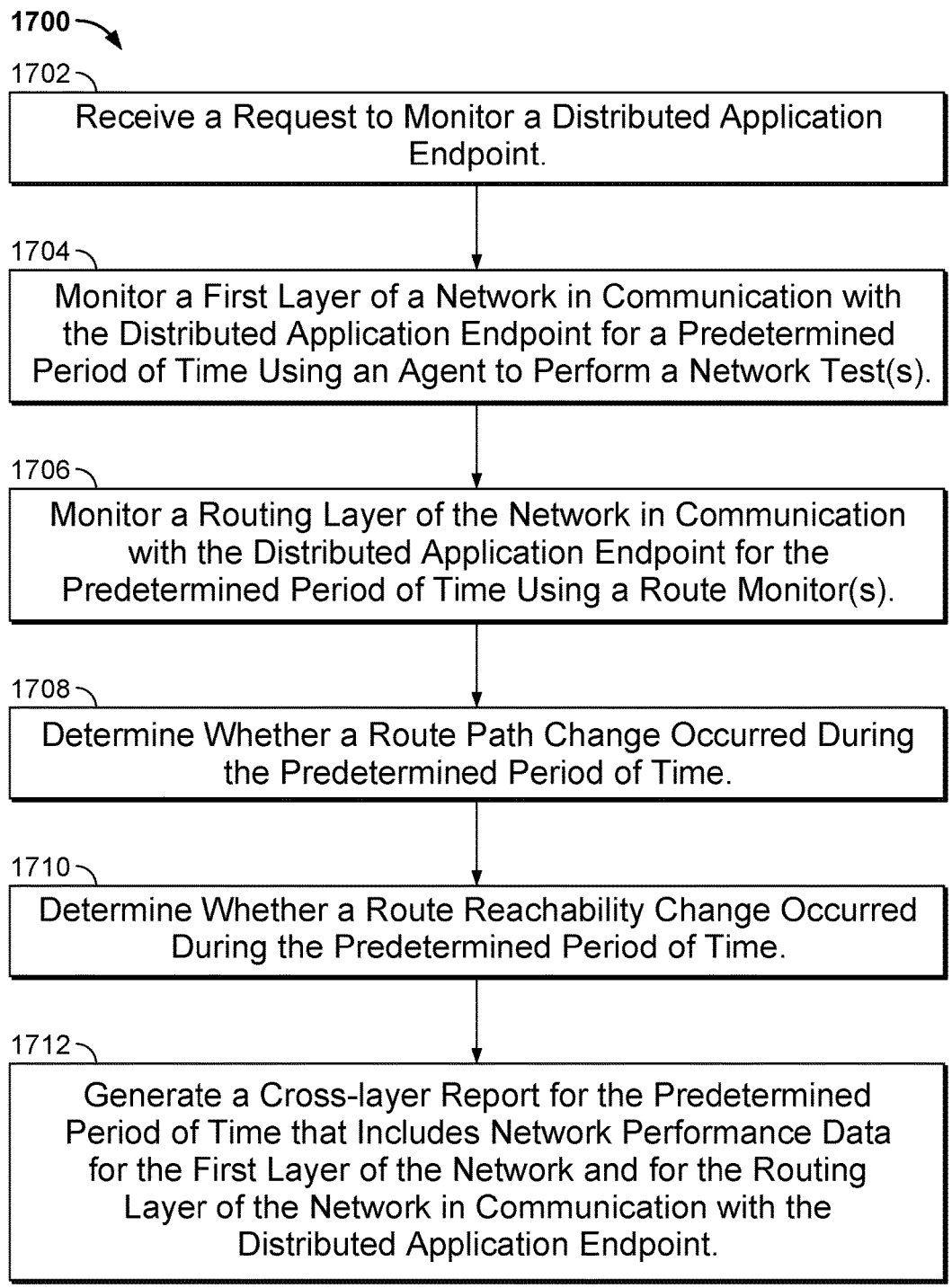
FIG. 17 is another flow diagram illustrating a process for monitoring service availability using distributed BGP routing feeds in accordance with some embodiments.

FIG. 17 is another flow diagram illustrating a process for monitoring service availability using distributed BGP routing feeds in accordance with some embodiments. In one embodiment, a process 1700 can be performed using platform 100 as shown in FIG. 1 and/or system 502 as shown in FIG. 5.

At 1702, a request to monitor a distributed application endpoint is received. For example, the distributed application endpoint, such as a web site/service, can be specified by an IP address or web site domain, and the prefix can then be determined, such as similarly described above.

At 1704, monitoring a first layer of a network in communication with a distributed application endpoint for a predetermined period of time by performing a network test using an agent is performed. For example, the agent can perform various network tests, such as similarly described above.

At 1706, monitoring a routing layer of the network in communication with a distributed application endpoint for a predetermined period of time using a route monitor is performed. For example, the (public/private) route monitor(s) can collect BGP routing data (e.g., for prefixes of interest), such as similarly described above.

At 1708, determining whether a route path change occurred during the predetermined period of time is performed. For example, a BGP metric for path changes can be determined for the predetermined period of time, such as similarly described above.

At 1710, determining whether a route reachability change occurred during the predetermined period of time is performed. For example, a BGP metric for reachability can be determined for the predetermined period of time, such as similarly described above.

At 1712, generating a cross-layer report for the predetermined period of time that includes network performance data for the first layer of the network and for the routing layer of the network in communication with the distributed application endpoint is performed. For example, the cross-layer report can include various BGP metrics, a timeline, and/or a topology graph, and/or various other visualizations, such as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for monitoring service availability using distributed Border Gateway Protocol (BGP) routing feeds, comprising:
    a processor configured to:
        collect BGP routing data from a plurality of distributed route monitors for monitoring service availability using distributed BGP routing feeds, wherein the plurality of distributed route monitors include a public route monitor and a private route monitor, wherein the private route monitor includes a router inside a private enterprise network that is configured to establish an external Border Gateway Protocol (eBGP) session with a route monitor collector to send BGP routing updates and BGP routing table transfers to collect BGP routing data from inside the private enterprise network, and wherein the public route monitor is outside of the private enterprise network and is configured to establish an eBGP session with a border router of each of a plurality of autonomous systems (AS) to collect BGP routing data from the plurality of AS;
        aggregate the collected BGP routing data into bins;
        determine a BGP metric based on the aggregated and collected BGP routing data; and
        generate a graphical visualization of an application delivery state for a plurality of application delivery layers that includes a cross-layer visualization that displays an overlap of a routing layer based on the aggregated and collected BGP routing data with monitored packet forwarding (loss) data; and
    a memory coupled to the processor and configured to provide the processor with instructions.

2. The system recited in claim 1, wherein the processor is further configured to:
collect BGP routing data from a plurality of distributed public route monitors for a plurality of selected BGP prefixes for a predetermined period of time.

3. The system recited in claim 1, wherein each of the bins corresponds to a predetermined period of time, and wherein the BGP metric is determined per bin.

4. The system recited in claim 1, wherein the BGP metric includes one or more of the following: a reachability metric, number of path changes metric, and a number of BGP updates metric.

5. The system recited in claim 1, wherein the processor is further configured to:
report the BGP metric based on the aggregated and collected BGP routing data.

6. The system recited in claim 1, wherein the processor is further configured to:
generate a graphical visualization of a plurality of routes based on the aggregated and collected BGP routing data.

7. The system recited in claim 1, wherein the processor is further configured to:
generate a graphical visualization of a plurality of routes based on the aggregated and collected BGP routing data, wherein the graphical visualization of the plurality of routes based on the aggregated and collected BGP routing data includes a topology graph.

8. The system recited in claim 1, wherein the processor is further configured to:
generate a graphical visualization of an application delivery state for a plurality of application delivery layers that includes a cross-layer correlation of a path trace with the routing layer to identify where network data loss is occurring along a network path.

9. The system recited in claim 1,
wherein the graphical visualization includes a mapping between a host name, IP address, and a BGP prefix.

10. The system recited in claim 1, wherein the processor is further configured to:
execute a user interface (UI) reporting engine for generating a display output that includes a graphical visualization of a plurality of routes based on the aggregated and collected BGP routing data.

11. The system recited in claim 1, wherein the processor is further configured to:
determine whether a root cause of a routing change problem is a result of a routing change inside the private enterprise network or outside the private enterprise network.

12. A method of monitoring service availability using distributed Border Gateway Protocol (BGP) routing feeds, comprising:
collecting BGP routing data from a plurality of distributed route monitors for monitoring service availability using distributed BGP routing feeds, wherein the plurality of distributed route monitors include a public route monitor and a private route monitor, wherein the private route monitor includes a router inside a private enterprise network that is configured to establish an external Border Gateway Protocol (eBGP) session with a route monitor collector to send BGP routing updates and BGP routing table transfers to collect BGP routing data from inside the private enterprise network, and wherein the public route monitor is outside of the private enterprise network and is configured to establish an eBGP session with a border router of each of a plurality of autonomous systems (AS) to collect BGP routing data from the plurality of AS;
aggregating the collected BGP routing data into bins;
determining a BGP metric using a processor based on the aggregated and collected BGP routing data; and
generating a graphical visualization of an application delivery state for a plurality of application delivery layers that includes a cross-layer visualization that displays an overlap of a routing layer based on the aggregated and collected BGP routing data with monitored packet forwarding (loss) data.

13. The method of claim 12, further comprising:
collecting BGP routing data from a plurality of distributed public route monitors for a plurality of selected BGP prefixes for a predetermined period of time.

14. The method of claim 12, wherein each of the bins corresponds to a predetermined period of time, and wherein the BGP metric is determined per bin.

15. The method of claim 12, wherein the BGP metric includes one or more of the following: a reachability metric, number of path changes metric, and a number of BGP updates metric.

16. The method of claim 12, further comprising:
reporting the BGP metric based on the aggregated and collected BGP routing data.

17. The method of claim 12, further comprising:
generating a graphical visualization of a plurality of routes based on the aggregated and collected BGP routing data.

18. The method of claim 12, further comprising:
generating a graphical visualization of a plurality of routes based on the aggregated and collected BGP routing data, wherein the graphical visualization of the plurality of routes based on the aggregated and collected BGP routing data includes a topology graph.

19. The method of claim 12, further comprising:
generating a graphical visualization of an application delivery state for a plurality of application delivery layers that includes a cross-layer correlation of a path trace with the routing layer to identify where network data loss is occurring along a network path.

20. The method of claim 12, wherein the graphical visualization includes a mapping between a host name, IP address, and a BGP prefix.

21. The method of claim 12, further comprising:
executing a user interface (UI) reporting engine for generating a display output that includes a graphical visualization of a plurality of routes based on the aggregated and collected BGP routing data.

22. The method of claim 12, further comprising:
determining whether a root cause of a routing change problem is a result of a routing change inside the private enterprise network or outside the private enterprise network.

23. A computer program product for monitoring service availability using distributed Border Gateway Protocol (BGP) routing feeds, the computer program product being embodied in a non-transitory tangible computer readable storage medium and comprising computer instructions for:
collecting BGP routing data from a plurality of distributed route monitors for monitoring service availability using distributed BGP routing feeds, wherein the plurality of distributed route monitors include a public route monitor and a private route monitor, wherein the private route monitor includes a router inside a private enterprise network that is configured to establish an external Border Gateway Protocol (eBGP) session with a route monitor collector to send BGP routing updates and BGP routing table transfers to collect BGP routing data from inside the private enterprise network, and wherein the public route monitor is outside of the private enterprise network and is configured to establish an eBGP session with a border router of each of a plurality of autonomous systems (AS) to collect BGP routing data from the plurality of AS;

aggregating the collected BGP routing data into bins;

determining a BGP metric based on the aggregated and collected BGP routing data; and generating a graphical visualization of an application delivery state for a plurality of application delivery layers that includes a cross-layer visualization that displays an overlap of a routing layer based on the aggregated and collected BGP routing data with monitored packet forwarding (loss) data.

24. The computer program product recited in claim 23, further comprising computer instructions for:

collecting BGP routing data from a plurality of distributed public route monitors for a plurality of selected BGP prefixes for a predetermined period of time.

25. The computer program product recited in claim 23, wherein each of the bins corresponds to a predetermined period of time, and wherein the BGP metric is determined per bin.

26. The computer program product recited in claim 23, wherein the BGP metric includes one or more of the following: a reachability metric, number of path changes metric, and a number of BGP updates metric.

27. The computer program product recited in claim 23, further comprising computer instructions for:

reporting the BGP metric based on the aggregated and collected BGP routing data.

28. The computer program product recited in claim 23, further comprising computer instructions for:

generating a graphical visualization of a plurality of routes based on the aggregated and collected BGP routing data.

29. The computer program product recited in claim 23, further comprising computer instructions for:

generating a graphical visualization of a plurality of routes based on the aggregated and collected BGP routing data, wherein the graphical visualization of the plurality of routes based on the aggregated and collected BGP routing data includes a topology graph.

30. The computer program product recited in claim 23, further comprising computer instructions for:

generating a graphical visualization of an application delivery state for a plurality of application delivery layers that includes a cross-layer correlation of a path trace with the routing layer to identify where network data loss is occurring along a network path.

31. The computer program product recited in claim 23, wherein the graphical visualization includes a mapping between a host name, IP address, and a BGP prefix.

32. The computer program product recited in claim 23, further comprising computer instructions for:

executing a user interface (UI) reporting engine for generating a display output that includes a graphical visualization of a plurality of routes based on the aggregated and collected BGP routing data.

33. The computer program product recited in claim 23, further comprising computer instructions for:

determining whether a root cause of a routing change problem is a result of a routing change inside the private enterprise network or outside the private enterprise network.

34. A system for monitoring service availability using distributed Border Gateway Protocol (BGP) routing feeds, comprising:

a processor configured to:

receive a request to monitor a distributed application endpoint;

monitor a first layer of a network in communication with the distributed application endpoint by performing a network test using an agent for a predetermined period of time;

monitor a routing layer of the network in communication with the distributed application endpoint using a route monitor, wherein the route monitor collects BGP routing data for the predetermined period of time; and generate a cross-layer report for the predetermined period of time that includes network performance data for the first layer of the network and for the routing layer of the network in communication with the distributed application endpoint, wherein the cross-layer report includes a correlation of a path trace with the routing layer to identify where network data loss is occurring along a network path, wherein the cross-layer report includes a mapping of a plurality of hostnames to IP addresses and a mapping of IP addresses to BGP prefixes, and wherein the cross-layer report includes a cross-layer visualization that displays an overlap of the routing layer with monitored packet forwarding (loss) data; and a memory coupled to the processor and configured to provide the processor with instructions.

35. The system recited in claim 34, wherein the processor is further configured to:

generate a graphical visualization of the routing layer based on aggregated and collected BGP routing data from a plurality of distributed route monitors.

36. The system recited in claim 34, wherein the processor is further configured to:

generate a plurality of BGP metrics based on aggregated and collected BGP routing data from a plurality of distributed route monitors.

37. The system recited in claim 34, wherein the processor is further configured to:

determine whether a route path change occurred during the predetermined period of time.

38. The system recited in claim 34, wherein the processor is further configured to:

determine whether a route reachability change occurred during the predetermined period of time.

39. The system recited in claim 34, wherein the processor is further configured to:

determine whether an inability to access the distributed application endpoint during the predetermined period of time is a result of a route change or route reachability change during the predetermined period of time.

40. A method for monitoring service availability using distributed Border Gateway Protocol (BGP) routing feeds, comprising:

receiving a request to monitor a distributed application endpoint;

monitoring a first layer of a network in communication with the distributed application endpoint by performing a network test using an agent for a predetermined period of time;

monitoring a routing layer of the network in communication with the distributed application endpoint using a route monitor, wherein the route monitor collects BGP routing data for the predetermined period of time; and generating a cross-layer report for the predetermined period of time that includes network performance data for the first layer of the network and for the routing layer of the network in communication with the distributed application endpoint, wherein the cross-layer report includes a correlation of a path trace with the routing to identify where network data loss is occurring along a network path, wherein the cross-layer report includes a mapping of a plurality of hostnames to IP addresses and a mapping of IP addresses to BGP prefixes, and wherein the cross-layer report includes a cross-layer visualization that displays an overlap of the routing layer with monitored packet forwarding (loss) data.

41. The method of claim 40, further comprising:
generating a graphical visualization of the routing layer based on aggregated and collected BGP routing data from a plurality of distributed route monitors.

42. The method of claim 40, further comprising:
generating a plurality of BGP metrics based on aggregated and collected BGP routing data from a plurality of distributed route monitors.

43. The method of claim 40, further comprising:
determining whether a route path change occurred during the predetermined period of time.

44. The method of claim 40, further comprising:
determining whether a route reachability change occurred during the predetermined period of time.

45. The method of claim 40, further comprising:
determining whether an inability to access the distributed application endpoint during the predetermined period of time is a result of a route change or route reachability change during the predetermined period of time.

46. A computer program product for monitoring service availability using distributed Border Gateway Protocol (BGP) routing feeds, the computer program product being embodied in a non-transitory tangible computer readable storage medium and comprising computer instructions for:
receiving a request to monitor a distributed application endpoint;
monitoring a first layer of a network in communication with the distributed application endpoint by performing a network test using an agent for a predetermined period of time;

monitoring a routing layer of the network in communication with the distributed application endpoint using a route monitor, wherein the route monitor collects BGP routing data for the predetermined period of time; and generating a cross-layer report for the predetermined period of time that includes network performance data for the first layer of the network and for the routing layer of the network in communication with the distributed application endpoint, wherein the cross-layer report includes a correlation of a path trace with the routing layer to identify where network data loss is occurring along a network path, wherein the cross-layer report includes a mapping of a plurality of hostnames to IP addresses and a mapping of IP addresses to BGP prefixes, and wherein the cross-layer report includes a cross-layer visualization that displays an overlap of the routing layer with monitored packet forwarding (loss) data.

47. The computer program product recited in claim 46, further comprising computer instructions for:
generating a graphical visualization of the routing layer based on aggregated and collected BGP routing data from a plurality of distributed route monitors.

48. The computer program product recited in claim 46, further comprising computer instructions for:
generating a plurality of BGP metrics based on aggregated and collected BGP routing data from a plurality of distributed route monitors.

49. The computer program product recited in claim 46, further comprising computer instructions for:
determining whether a route path change occurred during the predetermined period of time.

50. The computer program product recited in claim 46, further comprising computer instructions for:
determining whether a route reachability change occurred during the predetermined period of time.

51. The computer program product recited in claim 46, further comprising computer instructions for:
determining whether an inability to access the distributed application endpoint during the predetermined period of time is a result of a route change or route reachability change during the predetermined period of time.

* * * * *